(12) United States Patent
Murabayashi et al.

(10) Patent No.: US 12,456,228 B2
(45) Date of Patent: Oct. 28, 2025

(54) INFORMATION PROCESSING APPARATUS, INFORMATION PROCESSING METHOD, AND NON-TRANSITORY COMPUTER-READABLE STORAGE MEDIUM STORING INFORMATION PROCESSING PROGRAM

(71) Applicant: RISO KAGAKU CORPORATION, Tokyo (JP)

(72) Inventors: Ryuji Murabayashi, Tokyo (JP); Osamu Yasukochi, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 141 days.

(21) Appl. No.: 18/383,613

(22) Filed: Oct. 25, 2023

(65) Prior Publication Data
US 2024/0202976 A1    Jun. 20, 2024

(30) Foreign Application Priority Data

Dec. 9, 2022  (JP) ................................. 2022-196956
Dec. 9, 2022  (JP) ................................. 2022-197029
Dec. 9, 2022  (JP) ................................. 2022-197049

(51) Int. Cl.
*G06T 7/90*   (2017.01)
*G06T 11/00*  (2006.01)

(52) U.S. Cl.
CPC .............. *G06T 7/90* (2017.01); *G06T 11/001* (2013.01); *G06T 2207/10024* (2013.01)

(58) Field of Classification Search
CPC ..................... G06T 7/90; G06T 11/001; G06T 2207/10024
See application file for complete search history.

(56) References Cited

U.S. PATENT DOCUMENTS

| | | | |
|---|---|---|---|
| 7,558,422 B2 * | 7/2009 | Koyama | H04N 1/40012 345/589 |
| 7,605,930 B2 * | 10/2009 | Suzuki | G06T 5/73 358/1.14 |
| 9,367,764 B2 * | 6/2016 | Sakamaki | H04N 1/40012 |

(Continued)

FOREIGN PATENT DOCUMENTS

| | | | | |
|---|---|---|---|---|
| CN | 106155483 A | * | 11/2016 | .......... G06F 3/0481 |
| CN | 114942815 A | * | 8/2022 | .......... G06F 9/44505 |

(Continued)

*Primary Examiner* — Cheng Yuan Tseng
(74) *Attorney, Agent, or Firm* — GREENBLUM & BERNSTEIN, P.L.C.

(57) ABSTRACT

An information processing apparatus includes: a determiner configured to determine whether a combination of adjacent two colors in inputted image data is a combination in which a person with color blindness is likely to confuse the two colors; and a decider configured to decide, as a proposed change of the combination of the two colors, for the combination determined to be the combination in which the person with color blindness is likely to confuse the two colors by the determiner, a combination in which at least one of the two colors is changed such that the person with color blindness is capable of distinguishing the two colors and in which a degree of change of the at least one changed color of the two colors is minimized for a person with normal color vision.

16 Claims, 13 Drawing Sheets

(56) References Cited

U.S. PATENT DOCUMENTS

| | | | |
|---|---|---|---|
| 11,128,909 B2 * | 9/2021 | Cho | H04N 21/42202 |
| 2005/0111019 A1 | 5/2005 | Nakauchi et al. | |
| 2024/0202976 A1 * | 6/2024 | Murabayashi | G06T 11/001 |

FOREIGN PATENT DOCUMENTS

| | | | | |
|---|---|---|---|---|
| CN | 118216870 A | * | 6/2024 | |
| JP | 2004078325 A | * | 3/2004 | G06T 5/003 |
| JP | 2004272516 A | * | 9/2004 | |
| JP | 2005173634 A | * | 6/2005 | G06T 11/001 |
| JP | 2005-335257 | | 12/2005 | |
| JP | 2007240508 A | * | 9/2007 | |
| JP | 4200887 | | 12/2008 | |
| JP | 2010148065 A | * | 7/2010 | |
| JP | 2011250167 A | * | 12/2011 | G06T 11/001 |
| JP | 2012-230652 | | 11/2012 | |
| JP | 2014138249 A | * | 7/2014 | |
| JP | 2016-134694 | | 7/2016 | |
| JP | 2018098525 A | * | 6/2018 | |

* cited by examiner

INFORMATION PROCESSING APPARATUS, INFORMATION PROCESSING METHOD, AND NON-TRANSITORY COMPUTER-READABLE STORAGE MEDIUM STORING INFORMATION PROCESSING PROGRAM

CROSS-REFERENCE TO RELATED APPLICATIONS

The present application is based on and claims the benefit of priority from the prior Japanese Patent Application No. 2022-196956, filed on Dec. 9, 2022, the prior Japanese Patent Application No. 2022-197029, filed on Dec. 9, 2022, and the prior Japanese Patent Application No. 2022-197049, filed on Dec. 9, 2022, the entire contents of which are incorporated by reference herein.

TECHNICAL FIELD

The present disclosure relates to a document evaluation apparatus, a non-transitory computer-readable storage medium storing a document evaluation program, a document evaluation method, an image processing apparatus, a non-transitory computer-readable storage medium storing an image processing program, an image processing method, an information processing apparatus, an information processing method, and a non-transitory computer-readable storage medium storing an information processing program.

BACKGROUND

Japanese Patent Application Publication No. 2012-230652 proposes a readability evaluation method of determining whether each of a character height, a character width, an inter-character distance, a line space distance, the number of characters in one line, a character color, and the like that are readability factors of a text is within a recommended range and outputting the determination results.

Japanese Patent Application Publication No. 2005-335257 proposes a printer controller configured to calculate values of a character size, a line space, and a space between characters to fit a document into a page with a printing sheet size, on a condition that relationships between the character size, the line space, and the space between characters of text data received by a printer are unique.

Elements that affect easiness of reading (readability) of characters displayed on a display screen include "character size is small", "line space is small", "the number of characters in one line is large", "combination of colors of characters and a region adjacent to the characters is difficult to distinguish", and the like. When portions being causes of low readability as described above are to be presented to the user, a method of displaying additional image such as a surrounding line, an underline, or an icon by superimposing the additional image on an original image to be evaluated is conceivable.

When the additional image is displayed by being superimposed on the original image, an evaluator may have difficulty in distinguishing a color of the original image including the document to be evaluated and a color of the additional image such as the underline, the surrounding line, or the icon superimposed on the original image, depending on the combination of the colors.

Japanese Patent Application Publication No. 2016-134694 discloses a technique in which setting information for improving viewability for a user is saved in a mobile terminal held by the user and, when the user approaches an information processing apparatus, the mobile terminal transmits the setting information for improving the viewability for the user to the information processing apparatus and a screen display is switched.

Even when adjacent two colors such as a character color and a background color in a document or the like created by the user are not two colors confused by a person with normal color vision, these two colors sometimes form a combination of two colors likely to be confused by a person with color blindness.

Japanese Patent No. 4200887 discloses a technique of reducing likeliness of confusion by converting a color combination likely to cause confusion for the person with color blindness. In this technique, in the color combination likely to cause confusion for the person with color blindness, colors are converted such that an evaluation function is minimized, the evaluation function formed of a sum of a confusion degree expressed by a difference between colors in a color space recognized by the person with color blindness and a change degree expressed by a difference between colors before and after the conversion. The colors are thereby converted such that the person with color blindness can distinguish the colors at the same level as the person with normal color vision, for the color combination likely to cause confusion for the person with color blindness.

SUMMARY OF THE INVENTION

Elements that affect the easiness of reading (readability) of characters include "line space (leading) of a character string" and "the number of characters in one line".

In the techniques of Japanese Patent Application Publication Nos. 2012-230652 and 2005-335257, the numbers of characters and words in one line are adjusted to match an output range of a monitor, a screen of a mobile terminal, a paper sheet, or the like. However, the easiness of reading for a person is not prioritized in these methods.

For example, as a case of securing the line space and the number of characters in one line that allow easy reading for a person, there is such a standard, for example, for Japanese language that "when horizontal wiring is used, a line space of 1.5 lines or more should be secured, and one line should be set to include 45 characters or less" according to Universal Communication Design Association (UCDA) which is a Japanese organization.

There are various types of typefaces such as a Japanese typeface and a European typeface. In the Japanese typeface, characters are arranged to fit between a lower reference line and an upper reference line in an up-down direction irrespective of whether the characters are full-width characters or half-width characters. In the European typeface, there are characters that extend beyond the lower reference line such as, for example, "g" and "j".

In the techniques of Japanese Patent Application Publication Nos. 2012-230652 and 2005-335257, since the line space is set irrespective of the type of the characters, the readability may decrease in some cases.

The disclosure is directed to a document evaluation apparatus, a non-transitory computer-readable storage medium storing a document evaluation program, and a document evaluation method that can appropriately improve readability.

A document evaluation apparatus in accordance with some embodiments includes: a character determiner configured to determine whether a character requiring adjustment of a line space is used as an inspection target character: a line space determiner configured to determine whether the line space is appropriate based on a second line space threshold upon determination by the character determiner that the character requiring the adjustment of the line space is used, the second line space threshold being a threshold for the character requiring the adjustment of the line space and obtained by adjusting a first line space threshold for a character requiring no adjustment of a line space; and a notifier configured to make a notification upon determination by the line space determiner that the line space is not appropriate.

According the above configuration, the readability can be appropriately improved.

The technique described in Japanese Patent Application Publication No. 2016-134694 is a method of adjusting colors (hue, brightness, or saturation) in an entire screen operated by a user to improve discriminability of the colors arranged on the screen. However, searching for combinations of colors suitable for all users is difficult, and automatically appropriately adjusting the colors is difficult.

Moreover, means for identifying individual users is necessary to search for colors suitable for the individual users, and scenes where this technique is useable are limited.

The disclosure is directed to an image processing apparatus, an image processing method, and a non-transitory computer-readable storage medium storing an image processing program that appropriately improve readability.

An image processing apparatus in accordance with some embodiments includes: a display controller configured to display inputted image data on a display screen and display additional information by adding the additional information to an image displayed on the display screen; and an adjuster configured to perform highlighting by adjusting a color of the image data and a color of the additional information based on an external input such that readability of the image data to which the additional information is added is improved.

According the above configuration, the readability can be appropriately improved.

In the technique of Japanese Patent No. 4200887, since the color conversion is performed in consideration of only the person with color blindness, a change in color is too great for the person with normal color vision in some cases. As a result, design properties of an original image are impaired in some cases.

The disclosure is directed to an information processing apparatus, an information processing method, a non-transitory computer-readable storage medium storing an information processing program that can reduce likeliness of confusion of colors for the person with color blindness while suppressing changes in colors for the person with normal color vision.

An information processing apparatus in accordance with some embodiments includes: a determiner configured to determine whether a combination of adjacent two colors in inputted image data is a combination in which a person with color blindness is likely to confuse the two colors; and a decider configured to decide, as a proposed change of the combination of the two colors, for the combination determined to be the combination in which the person with color blindness is likely to confuse the two colors by the determiner, a combination in which at least one of the two colors is changed such that the person with color blindness is capable of distinguishing the two colors and in which a degree of change of the at least one changed color of the two colors is minimized for a person with normal color vision.

According to the above configuration, it is possible to reduce likeliness of confusion of colors for the person with color blindness while suppressing changes in colors for the person with normal color vision.

DETAILED DESCRIPTION OF THE INVENTION

Figure 1:
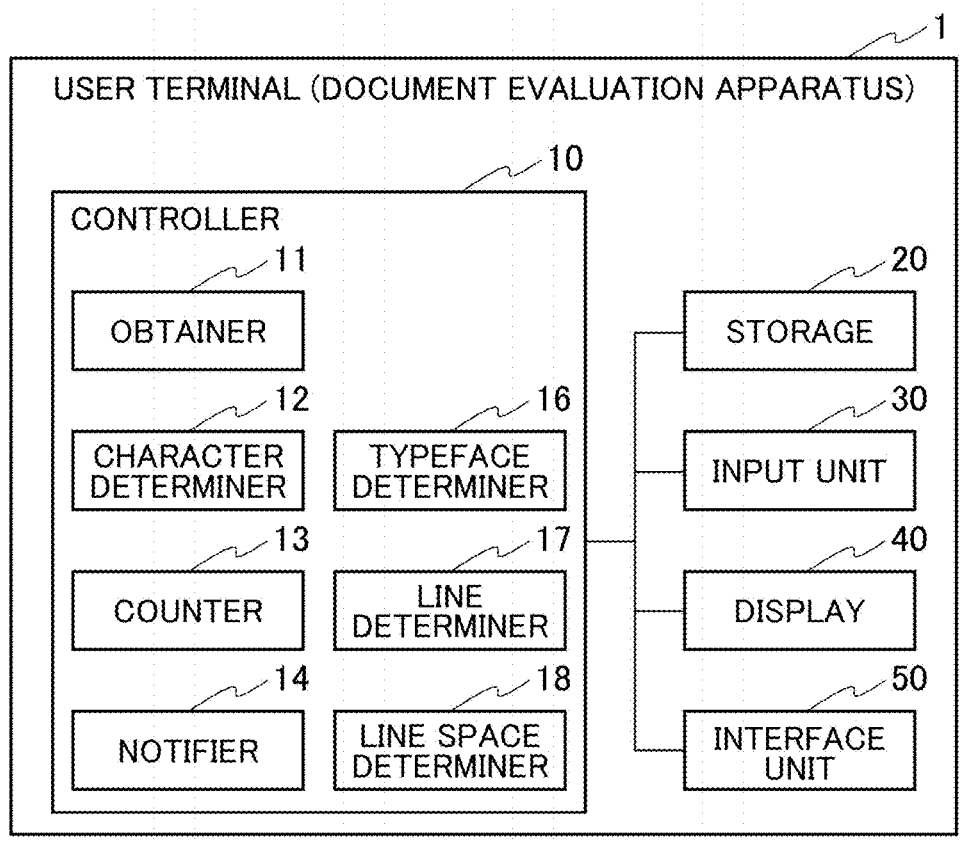
FIG. 1 is a configuration diagram illustrating a user terminal to which a document evaluation apparatus according to a first embodiment is applied.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

<Configuration of User Terminal>

FIG. 1 is a configuration diagram illustrating a user terminal 1 to which a document evaluation apparatus according to a first embodiment is applied.

As illustrated in FIG. 1, the user terminal 1 includes a controller 10, a storage 20, an input unit 30, a display 40, and an interface unit 50. The user terminal 1 is an example of the document evaluation apparatus. The user terminal 1 is, for example, an installed type terminal such as a desktop computer or a mobile terminal such as a tablet terminal, a smartphone, or a laptop computer.

The storage 20 includes, for example, a hard disk device and memories such as a read only memory (ROM) and a random access memory (RAM), the ROM being a read only semiconductor memory in which prescribed control programs are stored in advance, the RAM being a semiconductor memory to and from which data can be written and read at any time and which is used as a work storage area as necessary when a processor executes the various control programs. For example, a user stores non-inspection target characters in the storage 20 based on an input operation from the input unit 30.

The input unit 30 is, for example, a keyboard device, a mouse device, a touch panel, or the like, and receives inputs of various pieces of operation information made by the user. For example, the input unit 30 receives operations of specifying the non-inspection target characters by the user.

The display 40 is a display configured to display various pieces of information. As described later, the display 40 displays, for example, a display screen in which viewability of characters is displayed and a setting screen for specifying the non-inspection target characters. Note that a display including a touch panel can function as the input unit 30 and the display 40.

The interface unit 50 exchanges various pieces of information with another apparatus. For example, the interface unit 50 transmits a print job corresponding to document data created in the user terminal 1, to an image forming apparatus connected to the user terminal 1 wirelessly or via a wire.

The controller 10 includes, for example, a processor (for example, central processing unit: CPU) that functions as a computation processing device configured to control operations of the entire user terminal 1. The processor reads a prescribed program from the storage 20 or a non-transitory computer-readable storage medium, and executes the program to include an obtainer 11, a character determiner 12, a counter 13, a notifier 14, a typeface determiner 16, a line determiner 17, and a line space determiner 18.

The obtainer 11 obtains information on the height of characters in a character string of a document, information on the number of characters in one line of the character string, information on a line space of the character string, and information on line space adjustment in a European typeface. For example, the obtainer 11 obtains the information from a text file stored in the storage 20, text data extracted from image data such as a PDF file stored in the storage 20, a document creation application in middle of document creation, a print job (text data included in the print job) to be transmitted to the image forming apparatus, and the like.

The line space is an arrangement interval of lines that is a sum of the height of the characters and a gap between the lines, and is expressed as 1.5 lines (150%) or more based on the height of the characters or 2.0 lines (200%) or more based on the height of the characters.

The character determiner 12 determines whether the characters included in the document data correspond to inspection target characters or the non-inspection target characters. The inspection target characters are characters whose meanings need to be recognized by a person, and include both of half-width characters and full-width characters of a Japanese typeface (hiragana, katakana, and kanji) and the European typeface (English, French, German, and the like). The non-inspection target characters are punctuation marks (for example, ",", and "."), symbols (for example, "/", "(@)", and "¥"), a space, and the like, and characters inputted from the input unit 30 by the user are set as the non-inspection target characters. Note that, in FIG. 2A to be described later, characters denoted by reference sign JH is "hiragana" of the Japanese typeface, characters denoted by reference signs JKZ and JKH are "katakana" of the Japanese typeface, and characters denoted by reference JKJ is "kanji" of the Japanese typeface. Moreover, the characters denoted by reference sign JKZ are full-width "katakana", and the characters denoted by the reference sign JKH are half-width "katakana".

The counter 13 counts the number of characters per one line for characters determined to be the inspection target characters by the character determiner 12. Moreover, a method of counting the number of characters can be changed depending on the type of the characters according to a character counting method to be described later.

The notifier 14 notifies the user that the number of characters is not appropriate when the number of characters counted by the counter 13 is out of a prescribed range.

When a line space obtained by the line space determiner 18 to be described later is determined not to be equal to or more than a prescribed first line space threshold Th1 or when the line space obtained by the line space determiner 18 is determined not to be equal to or more than a second line space threshold Th2, the notifier 14 notifies the user that the line space is small.

For example, the notifier 14 performs the notification to the user by means of display control of the display 40. Note that, the notifier 14 may perform the notification to the user by means of display control of a display of an apparatus other than the user terminal 1, audio output by a not-illustrated audio output unit, or the like.

The typeface determiner 16 determines whether a typeface of characters determined to be the inspection target characters by the character determiner 12 is the European typeface or not. Note that, in the determination of the typeface, whether the typeface is the Japanese typeface or the European typeface may be determined by using a character code or by using the type of a used font.

The line determiner 17 determines whether or not each of lines included in the document data is a line including the inspection target characters determined to be the European typeface by the typeface determiner 16.

Figure 2A:
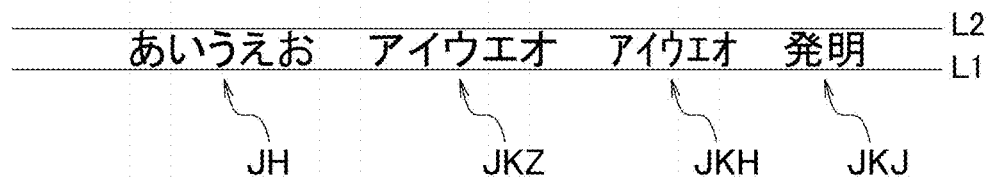
FIG. 2A is a diagram illustrating an example of a Japanese typeface.
Figure 2B:
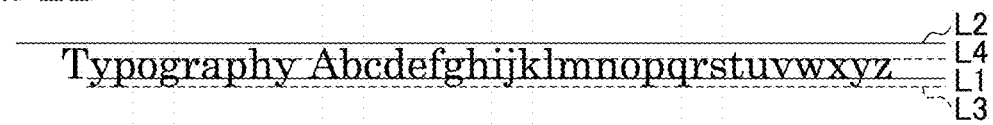
FIG. 2B is a diagram illustrating an example of a European typeface.

FIG. 2A is a diagram illustrating an example of the Japanese typeface. FIG. 2B is a diagram illustrating an example of the European typeface.

As illustrated in FIG. 2A, in the Japanese typeface, characters are arranged to be fitted between a lower reference line L1 and an upper reference line L2 in an up-down direction, irrespective of whether characters are full-width or half-width.

Meanwhile, as illustrated in FIG. 2B, a descender line L3 indicating a position of a lowest point of a character extending downward and a mean line L4 that is a line passing a head of a lower-case character are provided in addition to the lower reference line L1 and the upper reference line L2. Since the descender line L3 is provided as described above, there are characters such as, for example, "g" and "j" that extend beyond the lower reference line L1 and are drawn to the descender line L3 below the lower reference line L1. Even when a line includes European characters, it is desirable that the line space is set to suit Japanese characters. Accordingly, in a text in which Japanese characters and European characters are present in a mixed manner, the height of characters is high, and a gap between the lines is small. Thus, the line space based on the height of the characters takes a small value.

Accordingly, for the line that is determined not to include the European typeface by the line determiner 17, the line space determiner 18 determines whether or not the line space obtained by the obtainer 11 is equal to or more than the prescribed first line space threshold Th1. Meanwhile, for the line determined to include the European typeface by the line determiner 17, the line space determiner 18 determines whether or not the line space obtained by the obtainer 11 is equal to or more than the second line space threshold Th2 smaller than the first line space threshold Th1. Setting the second line space threshold Th2 to a value smaller than the first line space threshold Th1 as described above allows the line space between the line and the next line to be same in the entire text while achieving the line space that improves readability of the lines including the Japanese typeface in a text in which the Japanese typeface and the European typeface are present in a mixed manner.

Figure 3A:
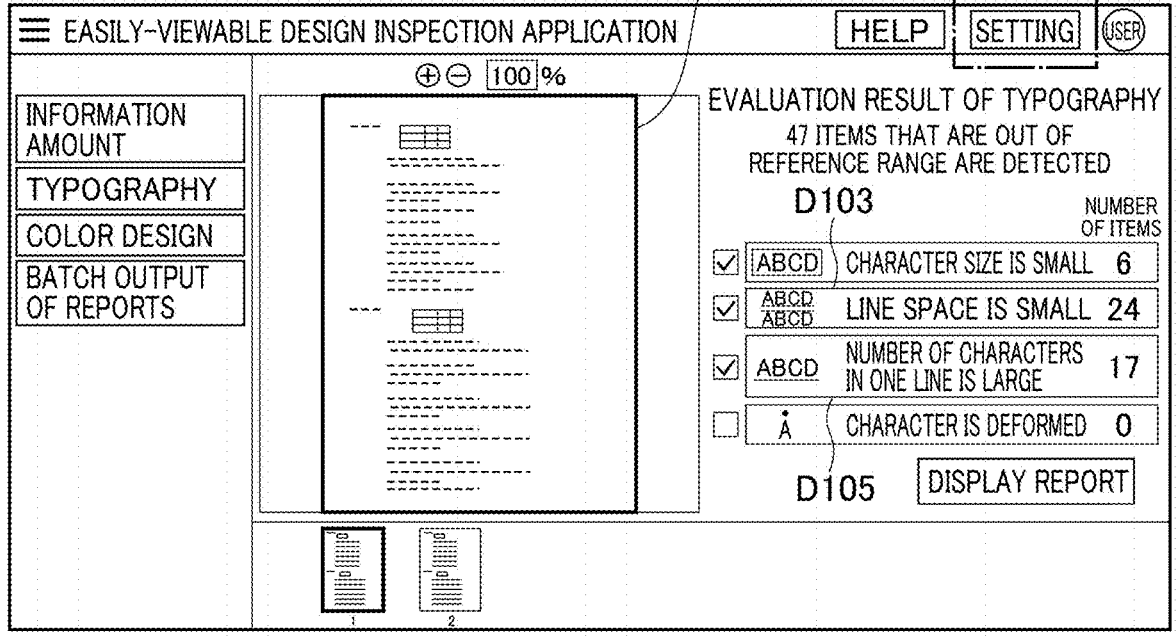
FIG. 3A is an example of a display screen displayed on a display included in the document evaluation apparatus according to the first embodiment.
Figure 3B:
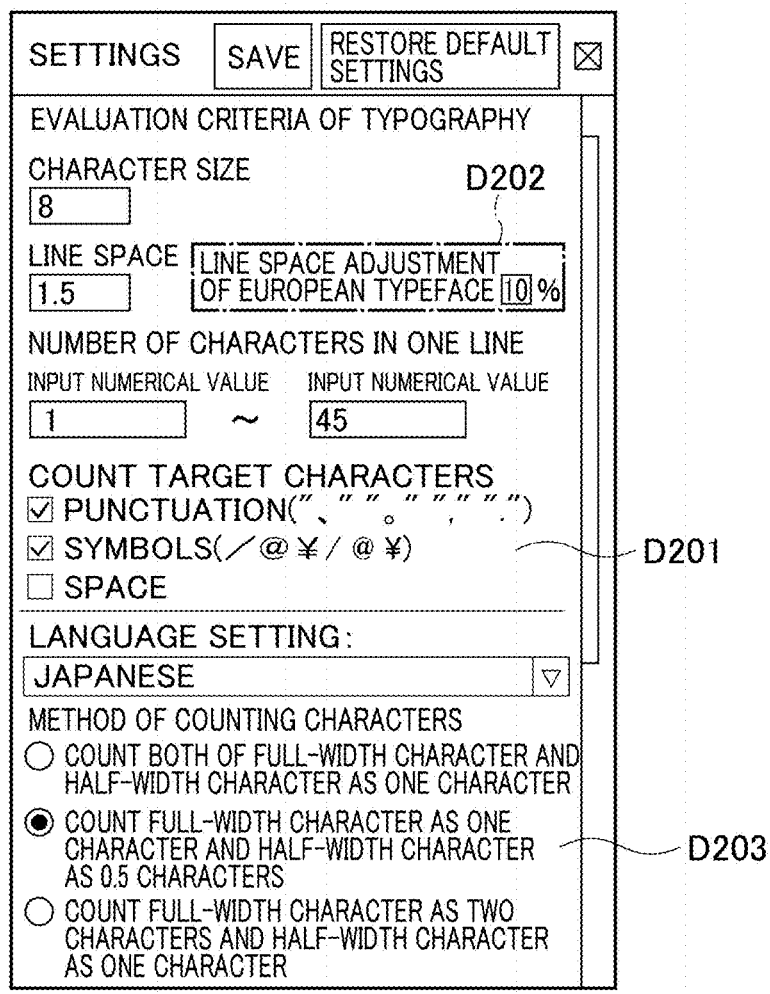
FIG. 3B is an example of a setting screen displayed on the display included in the document evaluation apparatus according to the first embodiment.

FIG. 3A is an example of a display screen displayed on the display 40 included in the document evaluation apparatus 1 according to the first embodiment. FIG. 3B is an example of a setting screen displayed on the display 40 included in the document evaluation apparatus 1 according to the first embodiment.

As illustrated in FIG. 3A, indication images such as surrounding frames, underlines, and double lines are displayed in a manner superimposed on characters in a determination state display region D101 of the display screen.

Explanation corresponding to the indication images displayed in D101 is displayed on the display screen, and, for example, an alarm D103 for notifying the user that the line space is small and an alarm D105 for notifying the user that the number of characters is large are provided in the display screen.

When the number of characters counted by the counter 13 is larger than a prescribed threshold, the notifier 14 displays the number of lines in which the number of characters is large, in the alarm D105. Moreover, when the line space obtained by the line space determiner 18 to be described later is determined not to be equal to or larger than the prescribed first line space threshold or when the line space obtained by the line space determiner 18 is determined not to be equal to or larger than the second line space threshold, the notifier 14 notifies the user of the number of lines in which the line space is small, in the alarm D103.

The display screen is provided with a setting button D107 for transition to the setting screen. The user performs an operation of pressing the setting button D107 to transition to the setting screen illustrated in FIG. 3B.

FIG. 3B is a screen for setting conditions in which the controller 10 operates.

As illustrated in FIG. 3B, an input region D202 for inputting the line space adjustment of the European typeface is provided in the setting screen. The user inputs the line space adjustment of the European typeface and performs a saving operation to store the inputted line space adjustment data in the storage 20.

The setting screen is provided with check boxes D201 used to set count target characters (inspection target characters). The check boxes D201 are provided, respectively, for items such as punctuation marks, symbols, a space, and the like to enable selection of each of the items. The user performs a selection operation from the input unit 30 to set the characters corresponding to the selected items as the inspection target characters, and characters corresponding to the not-selected items are set as the non-inspection target characters.

The setting screen is provided with radio buttons D203 for setting the character counting method. How many characters each of the full-width characters and the half-width characters is to be counted as is set by using the radio buttons D203, and the counter 13 counts the number of characters based on this setting.

Figure 4:
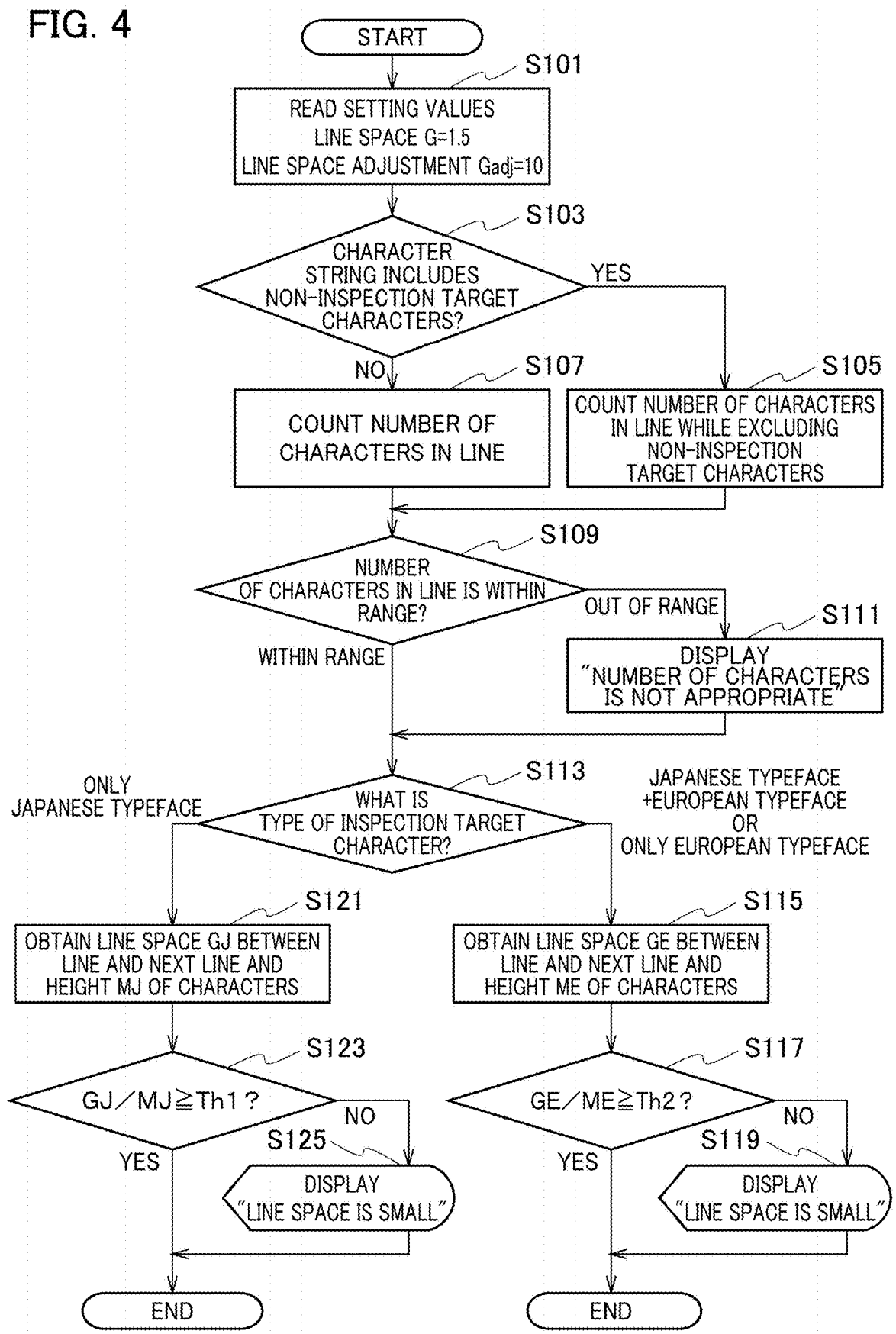
FIG. 4 is a flowchart illustrating processing contents in the user terminal according to the first embodiment.

FIG. 4 is a flowchart illustrating processing contents in the user terminal 1 according to the first embodiment.

As illustrated in FIG. 4, in step S101, the obtainer 11 obtains information on the number of characters in one line of a character string of a document stored in the storage 20, information on a line space of the character string, and information on the line space adjustment of the European typeface, as setting values. When the setting is made as in FIG. 3B, the information on the number of characters in one line is 1 to 45 characters, the line space G of the character string is 1.5, and the line space adjustment Gadj of the European typeface is 10.

In step S103, the character determiner 12 determines whether the characters string includes the non-inspection target characters.

When the character determiner 12 determines that the characters string includes the non-inspection target characters (step S103: YES), in step S105, the counter 13 counts the number of characters per one line for the characters determined to be the inspection target characters while excluding the non-inspection target characters.

Meanwhile, when the character determiner 12 determines that the character string includes no non-inspection target characters (step S103; NO), in step S107, the counter 13 counts the number of characters per one line of the character string.

In step S109, the notifier 14 determines whether the number of characters counted by the counter 13 is within the prescribed range. The prescribed range is information on the number of characters in one line of the character string for the character string of the document stored in the storage 20.

When the notifier 14 determines that the number of counted characters is out of the prescribed range in step S109 (step S109; out of range), in step S111, the notifier 14 notifies the user that the number of characters is not appropriate.

In step S113, the line determiner 17 determines whether or not the line includes a character that is determined to be the inspection target character by the character determiner 12 and that is the European typeface.

When the line determiner 17 determines that the line includes no European typeface (step S113; NO), that is the line includes only the Japanese typeface, in step S121, the obtainer 11 obtains the line space GJ between the line and the next line and the height MJ of the characters in the Japanese typeface.

In step S123, the notifier 14 determines whether a value GJ/MJ obtained by dividing the line space GJ obtained by the obtainer 11 by the height MJ of the characters obtained by the obtainer 11 is equal to or more than the prescribed first line space threshold Th1 (in this example, Th1=line space G="1.5").

When the notifier 14 determines that the value GJ/MJ is not equal to or more than the first line space threshold Th1 (step S123: NO), in step S125, the notifier 14 notifies the user that the line space is small.

Meanwhile, when the notifier 14 determines that the line includes the European typeface (step S113: YES), that is the Japanese typeface and the European typeface are present in a mixed manner or the line includes only the European typeface, in step S115, the obtainer 11 obtains the line space GE between the line and the next line and the height ME of the characters in the European typeface.

Figure 5:
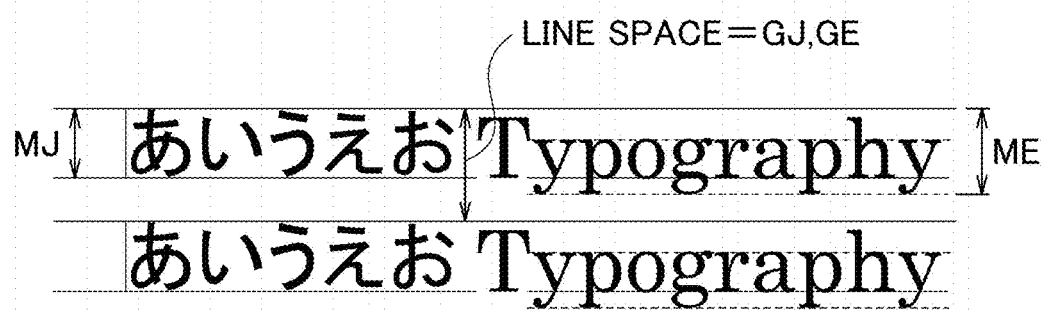
FIG. 5 is a diagram explaining a height of characters and a line space.

FIG. 5 is a diagram explaining the height of the characters and the line space.

As illustrated in FIG. 5, the line space GJ between the line and the next line and the height MJ of the characters in the Japanese typeface and the line space GE between the line and the next line and the height ME of the characters in the European typeface are obtained from an original, and the line space GJ and the line space GE are the same even when the Japanese typeface and the European typeface are present in a mixed manner. However, the height MJ of the characters in the Japanese typeface takes a different value from the height ME of the characters in the European typeface.

Since the line space of 1.5 lines is a standard for the Japanese typeface, the line space of each line for the European typeface may be smaller than that for the Japanese typeface by an amount corresponding to a larger height of the characters of the European typeface. Specifically, in the case of the European typeface, the line space needs to be slightly relaxed (reduced) from the standard 1.5 lines, in the line space adjustment.

For example, when the font size is 8 (pt), the height MJ of characters in the Japanese typeface is 8 (pt). The height in the European typeface slightly increases and, for example, the height ME of characters in the European typeface is 8.5 (pt).

Meanwhile, since the line space is 12 (pt) that is 1.5 times 8 (pt), the line space is 12 (pt)/8 (pt)=1.5 in the Japanese typeface, and is 12 (pt)/8.5 (pt)~1.41 in the European typeface. Accordingly, the line space of 1.5, which is the line space in the case where no line space adjustment is performed for the European typeface, is determined to be small. Thus, adjustment is performed while taking line space adjustment 10% into consideration such that the European typeface is within the allowable range of the line space.

In order to perform such line space adjustment, in step S123 of FIG. 4, the notifier 14 determines whether the value GE/ME obtained by dividing the line GE obtained by the obtainer 11 by the character height ME obtained by the obtainer 11 is equal to or more than the prescribed second line space threshold Th2 (in this example, "Th2=line space G×(100-line space adjustment Gadj)×0.01"). The line space adjustment Gadj is a value as follows: the user inputs the line space adjustment Gadj of the European typeface from the setting screen illustrated in FIG. 3B as described above, and the line space adjustment Gad is stored in the storage 20.

When the notifier 14 determines that the value GE/ME is not equal to or more than the prescribed second line space threshold Th2 (step S117; NO), in step S119, the notifier 14 notifies the user that the line space is small.

Since the second line space threshold Th2 is a smaller value than the first line space threshold Th1 as described above, determination of the line space based on the Japanese typeface can be performed in a text in which the Japanese characters and the European characters are present in a mixed manner.

The embodiment of the present disclosure has, for example, the following configuration and effects.

(Appendix 1)

A document evaluation apparatus including:
   a character determiner configured to determine whether a character requiring adjustment of a line space is used as an inspection target character;
   a line space determiner configured to determine whether the line space is appropriate based on a second line space threshold upon determination by the character determiner that the character requiring the adjustment of the line space is used, the second line space threshold being a threshold for the character requiring the adjustment of the line space and obtained by adjusting a first line space threshold for a character requiring no adjustment of a line space; and
   a notifier configured to make a notification upon determination by the line space determiner that the line space is not appropriate.

According to the above configuration, the readability can be appropriately improved. For example, determination of the readability can be appropriately performed also when characters such as, for example, "g" and "j" that extend below a lower end of the Japanese typeface are present in a mixed manner.

(Appendix 2)

The document evaluation apparatus according to appendix 1, wherein
   the character determiner is configured to determine whether each of characters included in document data is the inspection target character or a non-inspection target character that is not the inspection target character,
   the document evaluation apparatus further includes a counter configured to count a number of characters per one line for the characters determined to be the inspection target characters by the character determiner, and
   upon the number of characters counted by the counter being out of a prescribed range, the notifier is configured to make notification that the number of characters is out of the range.

According to the above configuration, characters (non-inspection target characters) that are not supposed to be read by a person such as punctuation marks (for example, "," and "."), symbols (for example, "/", "@", and "¥"), and a space are not counted as the number of characters per one line. Accordingly, these characters are not the targets of evaluation of readability, and the readability can be appropriately determined.

(Appendix 3)

The document evaluation apparatus according to appendix 1, wherein the character requiring no adjustment of the line space is a Japanese typeface, the character requiring the adjustment of the line space is a European typeface, and the second line space threshold is smaller than the first line space threshold.

According to the above configuration, the threshold of the line space can be appropriately set also in a text in which the Japanese typeface and the European typeface are present in a mixed manner. Accordingly, the readability can be appropriately determined.

(Appendix 4)

The document evaluation apparatus according to appendix 2, wherein the non-inspection target character is a character that does not affect readability and that includes at least one of a punctuation mark, a symbol, or a space character.

According to the above configuration, characters that are not supposed to be read by a person such as punctuation marks (for example, "," and "."), symbols (for example, "/", "(@", and "¥"), a space, and the like can be set as non-targets of the inspection. Accordingly, the line space can be appropriately set based on the inspection target characters supposed to be read by a person. Thus, the readability can be appropriately determined.

(Appendix 5)

A non-transitory computer-readable storage medium storing a document evaluation program causing a computer to execute processing including:

a character determination step of determining whether a character requiring adjustment of a line space is used as an inspection target character;

a line space determination step of determining whether the line space is appropriate based on a second line space threshold upon determination in the character determination step that the character requiring adjustment of the line space is used, the second line space threshold being a threshold for the character requiring the adjustment of the line space and obtained by adjusting a first line space threshold for a character requiring no adjustment of a line space; and a notifying step of making a notification upon determination in the line space determination step that the line space is not appropriate.

According to the above configuration, determination of the readability can be appropriately performed also when characters such as, for example, "g" and "j" that extend below a lower end of the Japanese typeface are present in a mixed manner.

(Appendix 6)

The non-transitory computer-readable storage medium storing the document evaluation program according to appendix 5, wherein the character determination step includes determining whether each of characters included in document data is the inspection target character or a non-inspection target character that is not the inspection target character, the document evaluation program further causes the computer to execute a counting step of counting a number of characters per one line for the characters determined to be the inspection target characters in the character determination step, and the notification step includes, upon the number of characters counted in the counting step being out of a prescribed range, making notification that the number of characters is out of the range.

According to the above configuration, characters (non-inspection target characters) that are not supposed to be read by a person such as punctuation marks (for example, "," and "."), symbols (for example, "/", "(@", and "¥"), and a space are not counted as the number of characters per one line. Accordingly, these characters are not the targets of evaluation of readability, and the readability can be appropriately determined.

(Appendix 7)

A document evaluation method including:

a character determination step of determining whether a character requiring adjustment of a line space is used as an inspection target character;

a line space determination step of determining whether the line space is appropriate based on a second line space threshold upon determination in the character determination step that the character requiring adjustment of the line space is used, the second line space threshold being a threshold for the character requiring the adjustment of the line space and obtained by adjusting a first line space threshold for a character requiring no adjustment of a line space; and a notifying step of making a notification upon determination in the line space determination step that the line space is not appropriate.

According to the above configuration, determination of the readability can be appropriately performed also when characters such as, for example, "g" and "j" that extend below a lower end of the Japanese typeface are present in a mixed manner.

(Appendix 8)

The document evaluation method according to appendix 7, wherein the character determination step includes determining whether each of characters included in document data is the inspection target character or a non-inspection target character that is not the inspection target character, the document evaluation method further includes a counting step of counting a number of characters per one line for the characters determined to be the inspection target characters in the character determination step, and the notification step includes, upon the number of characters counted in the counting step being out of a prescribed range, making notification that the number of characters is out of the range.

According to the above configuration, characters (non-inspection target characters) that are not supposed to be read by a person such as punctuation marks (for example, "," and "."), symbols (for example, "/", "(@)", and "¥"), and a space are not counted as the number of characters per one line. Accordingly, these characters are not the targets of evaluation of readability, and the readability can be appropriately determined.

Second Embodiment

<Configuration of User Terminal>

Figure 6:
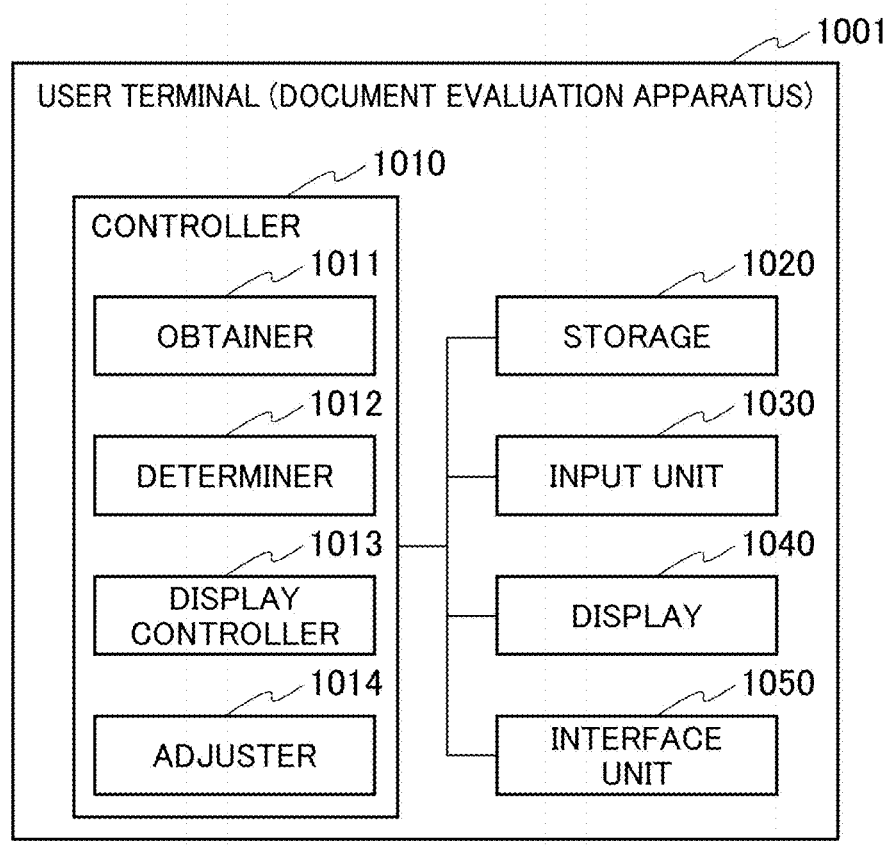
FIG. 6 is a configuration diagram illustrating a user terminal to which an image processing apparatus according to a second embodiment is applied.

FIG. 6 is a configuration diagram illustrating a user terminal 1001 to which an image processing apparatus according to a second embodiment is applied.

As illustrated in FIG. 6, the user terminal 1001 includes a controller 1010, a storage 1020, an input unit 1030, a display 1040, and an interface unit 1050. The user terminal 1001 is an example of an image processing apparatus. The user terminal 1001 is, for example, an installed-type terminal such as a desktop computer or a mobile terminal such as a tablet terminal, a smartphone, or a laptop computer.

The storage 1020 includes, for example, a hard disk device and memories such as a read only memory (ROM) and a random access memory (RAM), the ROM a read only semiconductor memory in which prescribed control programs are stored in advance, the RAM being a semiconductor memory to and from which data can be written and read at any time and which is used as a work storage area as necessary when a processor executes the various control programs. For example, a user stores non-inspection target characters in the storage 1020 based on an input operation from the input unit 1030.

The input unit 1030 is, for example, a keyboard device, a mouse device, a touch panel, or the like, and receives inputs of various pieces of operation information made by the user. For example, the input unit 1030 receives operations of specifying brightness and saturation by the user.

The display 1040 is a display configured to display various pieces of information. As described later, the display 1040 displays screens such as, for example, a display screen in which a viewability of characters is displayed. Note that a display including the touch panel can function as the input unit 1030 and the display 1040.

The interface unit 1050 exchanges various pieces of information with another apparatus. For example, the interface unit 1050 transmits a print job corresponding to document data created in the user terminal 1001, to an image forming apparatus connected to the user terminal 1001 wirelessly or via a wire.

The controller 1010 includes, for example, a processor (for example, central processing unit: CPU) that functions as a computation processing device configured to control operations of the entire user terminal 1001. The processor reads a prescribed program from the storage 1020 or a non-transitory computer-readable storage medium, and executes the program to include an obtainer 1011, a determiner 1012, a display controller 1013, and an adjuster 1014.

The obtainer 1011 obtains information on a character size and a line space of a character string in a document, information on the height of characters in the character string, information on the number of characters in one line of the character string, and information on a combination of colors of characters and a background (object adjacent to the characters) of the characters. For example, the obtainer 1011 obtains the information from a text file stored in the storage 1020, text data extracted from image data such as a PDF file stored in the storage 1020, a document creation application in middle of document creation, a print job (text data included in the print job) to be transmitted to the image forming apparatus, and the like.

The determiner 1012 determines whether readability of characters included in image data satisfies prescribed conditions. In this example, the prescribed conditions are conditions set in advance for "character size", "line space", "the number of characters in one line", and "combination of colors of characters and a background (object adjacent to the characters) of the characters", respectively. For example, conditions such as "10 (points) or more" is defined for the "character size". The determiner 1012 determines whether "character size", "line space", and "the number of characters in one line" satisfy the prescribed conditions, and determines whether the combination of the colors of the characters and the background (object adjacent to the characters) of the characters satisfies a condition in which a person with color blindness or an elderly person can discriminate the characters and the background. These prescribed conditions are stored in the storage 1020. The display controller 1013 displays inputted image data on a display screen, and displays additional information by adding the additional information to the image displayed on the display screen.

Figure 7:
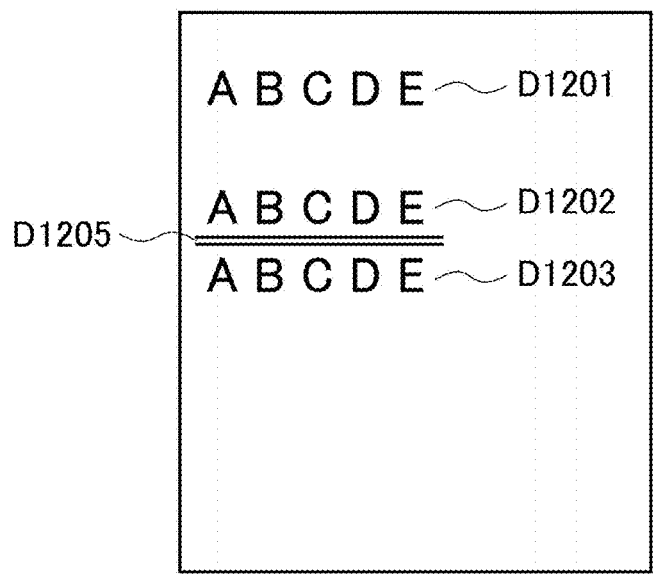
FIG. 7 is a diagram illustrating an example of image data and additional information displayed on a display by a display controller included in the user terminal according to the second embodiment.

FIG. 7 is a diagram illustrating an example of the image data and the additional information displayed on the display 1040 by the display controller 1013 included in the user terminal 1001 according to the second embodiment.

As illustrated in FIG. 7, character strings D1201 to D1203 are displayed by using characters of "ABCDE". In this example, it is assumed that a line space between the character string D1202 and the character string D1203 is small, and the determiner 1012 has determined that the condition of the line space is not satisfied.

In this case, the display controller 1013 displays additional information D1205 by adding the additional information D1205 to the character string D1202 that is displayed on the display screen and that is determined not to satisfy the condition by the determiner 1012. The additional information D1205 is a color double line inserted between the character string D1202 and the character string D1203.

Although the color double line is inserted between the character string D1202 and the character string D1203 as the additional information D1205 in this example, the shape of the additional information is not limited to the double line. For example, the shape may be a single line or a surrounding line, and this can be set by the user. Specifically, the display controller 1013 can display the additional information having a prescribed shape with respect to the image data by superimposing the additional information on the image data, based on a user input from the input unit 1030.

The adjuster 1014 adjusts the color of the image data and the color of the additional information based on an external input such that readability of the image data to which the additional information is added is improved.

Figure 8A:
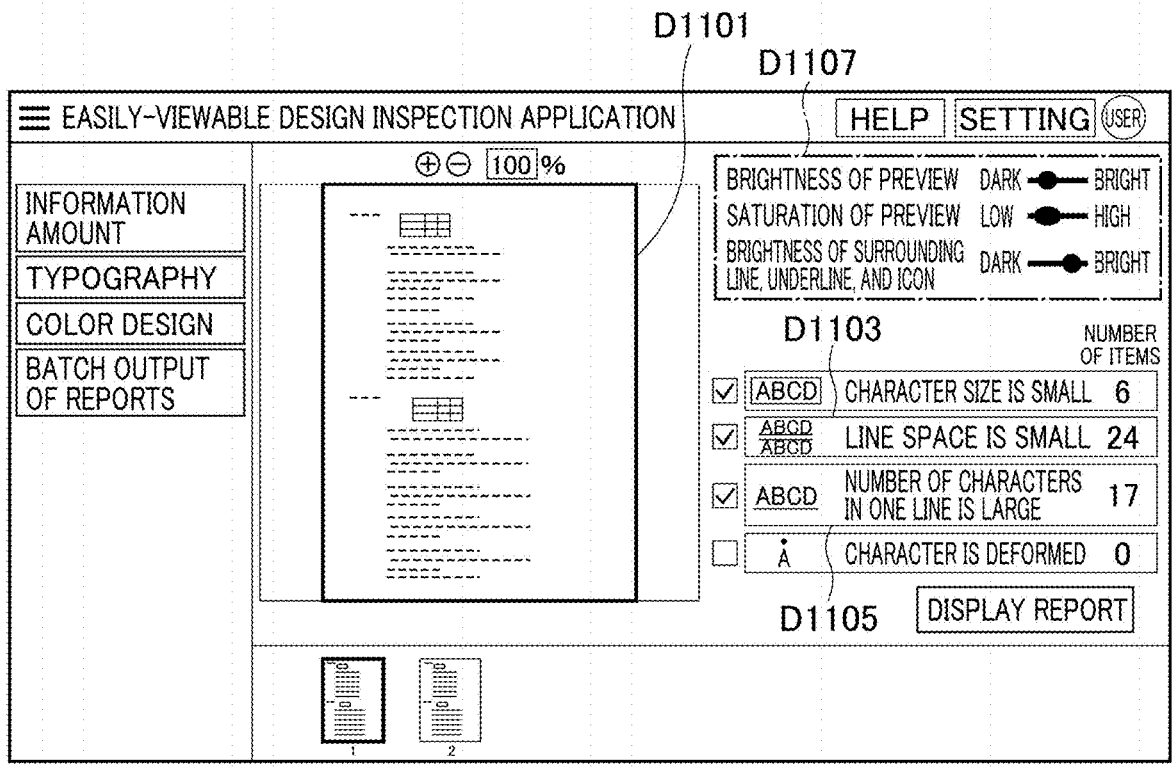
FIG. 8A is an example of a display screen displayed on the display included in the user terminal according to the second embodiment.
Figure 8B:
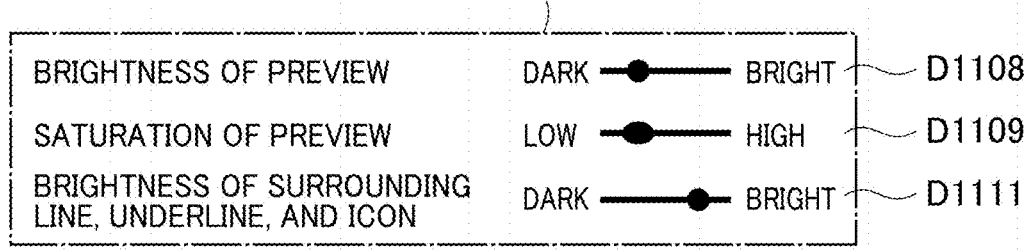
FIG. 8B is an example of a setting input region provided in the display screen displayed on the display included in the user terminal according to the second embodiment.

FIG. 8A is an example of a display screen displayed on the display 1040 included in the user terminal 1001 according to the second embodiment. FIG. 8B is an example of a setting input region provided in the display screen displayed on the display 1040 included in the user terminal 1001 according to the second embodiment.

As illustrated in FIG. 8A, in a determination state display region D1101 of the display screen, the additional information is displayed by being added to the image based on a determination result determined by the determiner 1012.

Various alarm displays are provided in the display screen, and the display screen is provided with, for example, an alarm D1103 for notifying the user that the line space is small and an alarm D1105 for notifying the user that the number of characters is large.

The display screen is provided with a setting input region D1107 for adjusting brightness and saturation of the image or the brightness of the additional information.

In detail, as illustrated in FIG. 8B, in the setting input region D1107, an adjustment bar D1108 for adjusting the brightness of a preview (image), an adjustment bar D1109 for adjusting the saturation of the preview (image), and an adjustment bar D1111 for adjusting the brightness of a surrounding line, an underline, or an icon (additional information) are each displayed to be adjustable.

The user can adjust the brightness of the preview (image) in one of a bright direction or a dark direction by sliding the adjustment bar D1108 through a user input on the input unit 1030.

The use can adjust the saturation of the preview (image) in one of a low saturation direction (dusty color (gray scale) with less feeling of tone) or a high saturation direction (vivid primary color) by sliding the adjustment bar D1109 through a user input on the input unit 1030.

The user can adjust the brightness of the surrounding line, the underline, or the icon (additional information) in one of a bright direction or a dark direction by sliding the adjustment bar D1111 through a user input on the input unit 1030.

When the user performs input as in the setting input region D1107 illustrated in FIG. 8B, the adjuster 1014 adjusts the brightness or the saturation of the image data or the brightness of the additional information depending on the inputted contents, and highlighting is thereby performed such that the readability of the image data to which the additional information is added and which is displayed in the determination state display region D1101 of the display screen is improved.

<Adjustment of Brightness>

Figure 9A:
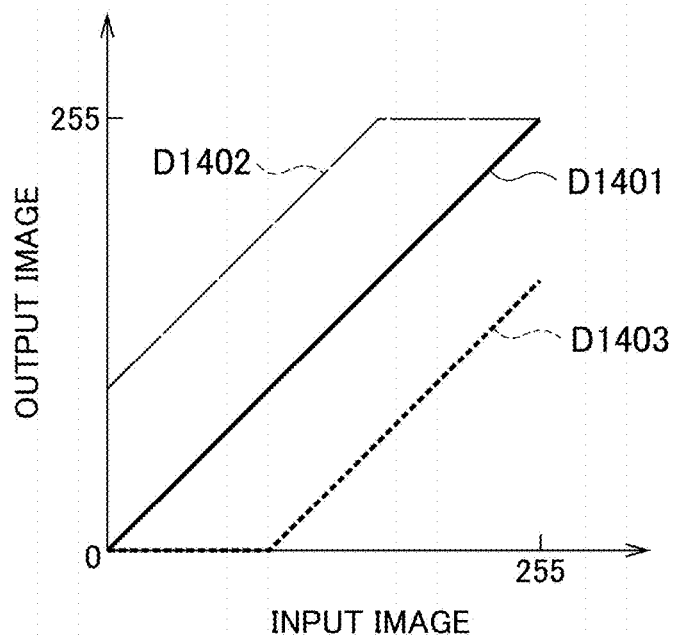
FIG. 9A is an explanatory diagram explaining linear adjustment of brightness of an image by an adjuster included in the user terminal according to the second embodiment.
Figure 9B:
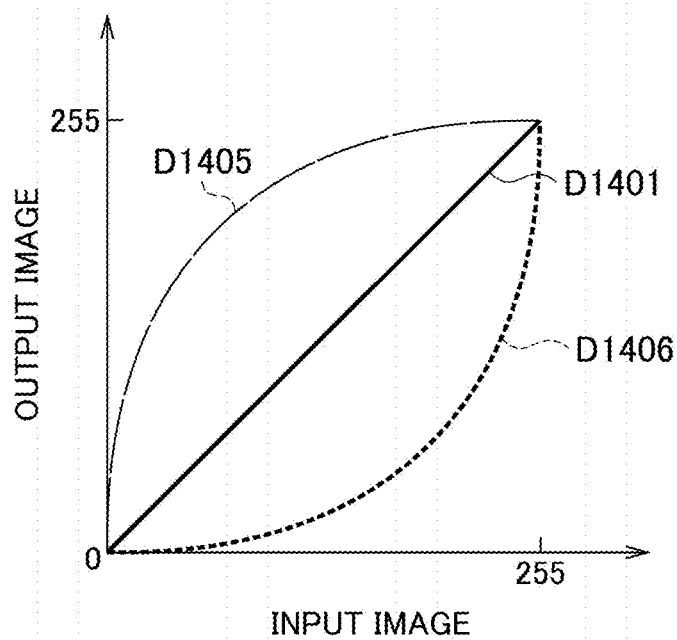
FIG. 9B is an explanatory diagram explaining continuous adjustment of brightness of an image by the adjuster included in the user terminal according to the second embodiment.

FIG. 9A is an explanatory diagram explaining linear adjustment of brightness of an image by the adjuster 1014 included in the user terminal 1001 according to the second embodiment. FIG. 9B is an explanatory diagram explaining continuous adjustment of brightness of an image by the adjuster 1014 included in the user terminal 1001 according to the second embodiment. In the FIGS. 9A and 9B, an x axis represents a pixel value of one of RGB in an inputted image, and a y axis represents a pixel value of one of RGB in an outputted image highlighted by the adjuster 1014.

Assume a case where the linear adjustment of brightness of an image is performed as illustrated in FIG. 9A. In this case, when the user performs an operation of sliding the adjustment bar D1108 in the bright direction for original image data D1401, the pixel value of one of RGB increases, and highlighted image data (brightened image data) D1402 thus takes a pixel value shifted to the left. Since the RGB value is assumed to be within a range of "0" to "255", the RGB value is "255" when it reaches the upper limit "255".

Meanwhile, when the user performs an operation of sliding the adjustment bar D1108 in the dark direction for the original image data D1401, the pixel value of one of RGB decreases, and highlighted image data (darkened image data) D1403 thus takes a pixel value shifted to the right. Since the RGB value is assumed to be within a range of "0" to "255", the RGB value is "O" when it reaches the lower limit "0".

Similarly for the additional information, when the user performs an operation of sliding the adjustment bar D1111 in the bright direction, the additional information takes a pixel value shifted to the left. Moreover, when the user performs an operation of sliding the adjustment bar D1111 in the dark direction, the additional information takes a pixel value shifted to the right.

Assume a case where the continuous adjustment of the brightness of the image is performed as illustrated in FIG. 9B. In this case, when the user performs an operation of sliding the adjustment bar D1108 in the bright direction for the original image data D1401, the pixel value of one of RGB increases, and highlighted image data (brightened image data) D1405 thus takes a continuous pixel value bulging toward the left side as a whole.

Assume a case where the continuous adjustment of the brightness of the image is performed as illustrated in FIG. 9B. In this case, when the user performs an operation of sliding the adjustment bar D1108 in the dark direction for the original image data D1401, the pixel value of one of RGB decreases, and highlighted image data (darkened image data) D1406 thus takes a continuous pixel value bulging toward the right side as a whole.

As described above, the user inputs the brightness in the setting input region D1107 in consideration of a color vision characteristic while checking the image displayed on the display 1040, and this allows the adjuster 1014 to adjust the brightness of the image data and the additional information based on the input. Accordingly, it is possible to produce a color difference between the additional information and the image data and improve the viewability of the additional information.

<Adjustment of Saturation>

As described above, the adjustment bar D1109 for adjusting the saturation of the preview (image) is displayed to be adjustable in the setting input region D1107 of the display screen displayed on the display 1040.

The user can adjust the saturation of the preview (image) in one of the low saturation direction (dusty color (gray scale) with less feeling of tone) or the high saturation direction (vivid primary color) by sliding the adjustment bar D1109 through the user input on the input unit 1030.

In this example, the saturation is calculated by using the following (Math 1) to (Math 3) in default. The display controller 1013 displays the adjustment bar D1109 of the display 1040 based on a calculated saturation S.

$$\text{MAX} = \text{Max}(R, G, B) \tag{Math 1}$$

$$\text{MIN} = \text{Min}(R, G, B) \tag{Math 2}$$

$$\text{Convergence value } CNT = (\text{MAX} + \text{MIN})/2 \tag{Math 3}$$

In this case, Max( ) is a function for obtaining the maximum value, and Min( ) is a function for obtaining the minimum value. When the convergence value CNT is smaller than 128, the saturation S is calculated by using the following (Math 4).

$$\text{Saturation } S = (\text{MAX} - \text{MIN})/(\text{MAX} + \text{MIN}) \tag{Math 4}$$

When the convergence value CNT is equal to or more than 128, the saturation S is calculated by using the following (Math 5).

$$\text{Saturation } S = (\text{MAX} - \text{MIN})/(510 - \text{MAX} - \text{MIN}) \tag{Math 5}$$

When the user performs the sliding operation on the adjustment bar D1109, the adjuster 1014 adjusts the saturation of each of pixels of RGB in the image data by using the following (Math 6) to (Math 8) depending on the input contents of the sliding operation (operated saturation S'), and thereby performs highlighting such that the readability of the image data to which the additional information is added is improved.

Saturation S' after change (range: 0 to 1.0, 0: low saturation, 1: high saturation)

$$R' \text{ after change} = CNT - (CNT - R) * S'/S \tag{Math 6}$$

$$G' \text{ after change} = CNT - (CNT - G) * S'/S \tag{Math 7}$$

$$B' \text{ after change} = CNT - (CNT - B) * S'/S \tag{Math 8}$$

For example, when the saturation S' is "0" (%), all colors of R, G, and B have a density of the convergence value, and the obtained color is a gray color (no saturation). Meanwhile, when the saturation S' is "1" (%) to "100" (%), the higher the value is, the farther away the color is from the convergence value (differences among the colors of R, G, and B increase, and the obtained color is a color with high saturation). Accordingly, in some cases, the readability of the image data is high when the saturation of the image data is high and, in other cases, the readability of the image data is high when the saturation of the image data is conversely low, depending on the combination of the color of the characters in the image data and the color of the additional information. For example, when a color with high saturation is used for the additional information and many colors are used for the image data, the colors of the additional information and the image data are mixed, and the viewability decreases in some case. However, reducing the saturation of the image data and bringing the colors of the image data closer to gray scale can improve the viewability of the color of the additional information.

As described above, the user inputs the saturation in the setting input region D1107 in consideration of a color vision characteristic while checking the image displayed on the display 40, and this allows the adjuster 1014 to adjust the saturation of the image data based on the input. Accordingly, it is possible to produce a color difference between the additional information and the image data and improve the viewability of the additional information.

Although description is given by using the addition of the color double line between the character string D1202 and the character string D1203 as an example of the additional information D1205 in the example illustrated in FIG. 7, the additional information is not limited to this, and may have various other shapes such as a surrounding line as long as the shape can identify a character. Moreover, the line type of the surrounding line and the underline is not limited a solid line, and may be any of various line types such as a broken line and a one-dot dash line.

The embodiment of the present disclosure has, for example, the following configuration and effects.

(Appendix 9)

An image processing apparatus including:
a display controller configured to display inputted image data on a display screen and display additional information by adding the additional information to an image displayed on the display screen; and
an adjuster configured to perform highlighting by adjusting a color of the image data and a color of the additional information based on an external input such that readability of the image data to which the additional information is added is improved.

According to the above configuration, the readability can be appropriately improved. For example, the user inputs a color while checking the image displayed on the display screen, and this allows the adjuster to adjust the colors of the image data and the additional information based on the input. Accordingly, the readability of the image data to which the additional information is added can be improved.

(Appendix 10)

The image processing apparatus according to appendix 9, wherein the adjuster is configured to adjust a brightness of at least one of the image data or the additional information based on an external input taking a color vision characteristic into consideration.

According to the above configuration, the user inputs the brightness in consideration of the color vision characteristic while checking the image displayed on the display screen, and this allows the adjuster to adjust the brightness of the image data or the additional information based on the input. Accordingly, the readability of the image data to which the additional information is added can be improved.

(Appendix 11)

The image processing apparatus according to appendix 9, wherein the adjuster is configured to adjust a saturation of the image data based on an external input taking a color vision characteristic into consideration.

According to the above configuration, the user inputs the saturation in consideration of the color vision characteristic while checking the image displayed on the display screen, and this allows the adjuster to adjust the saturation of the image data based on the input. Accordingly, the readability of the image data to which the additional information is added can be improved.

(Appendix 12)

The image processing apparatus according to appendix 9, further including a determiner configured to determine whether readability of a character included in the image data satisfies a prescribed condition, wherein
the display controller is configured to display the additional information by adding the additional information to the character determined not to satisfy the prescribed condition by the determiner.

According to the above configuration, the additional information is added to the image and displayed only when the readability of the character included in the image data does not satisfy the prescribed condition. Accordingly, the readability of the image data can be further improved.

(Appendix 13)

The image processing apparatus according to appendix 9, wherein the display controller is configured to display the additional information having a prescribed shape with respect to the image data by superimposing the additional information on the image data, based on an external input.

According to the above configuration, the additional information having various shapes can be added to the image and displayed. Accordingly, the readability of the image data can be improved.

(Appendix 14)

A non-transitory computer-readable storage medium storing an image processing program causing a computer to execute processing including:
displaying inputted image data on a display screen and displaying additional information by adding the additional information to an image displayed on the display screen; and
adjusting a color of the image data and a color of the additional information based on an external input such that readability of the image data to which the additional information is added is improved.

According to the above configuration, the user inputs a color while checking the image displayed on the display screen, and this allows the adjuster to adjust the colors of the image data and the additional information based on the input. Accordingly, the readability of the image data to which the additional information is added can be improved.

(Appendix 15)

An image processing method including:
displaying inputted image data on a display screen and displaying additional information by adding the additional information to an image displayed on the display screen; and
adjusting a color of the image data and a color of the additional information based on an external input such that readability of the image data to which the additional information is added is improved.

According to the above configuration, the user inputs a color while checking the image displayed on the display screen, and this allows the adjuster to adjust the colors of the image data and the additional information based on the input. Accordingly, the readability of the image data to which the additional information is added can be improved.

Third Embodiment

Figure 10:
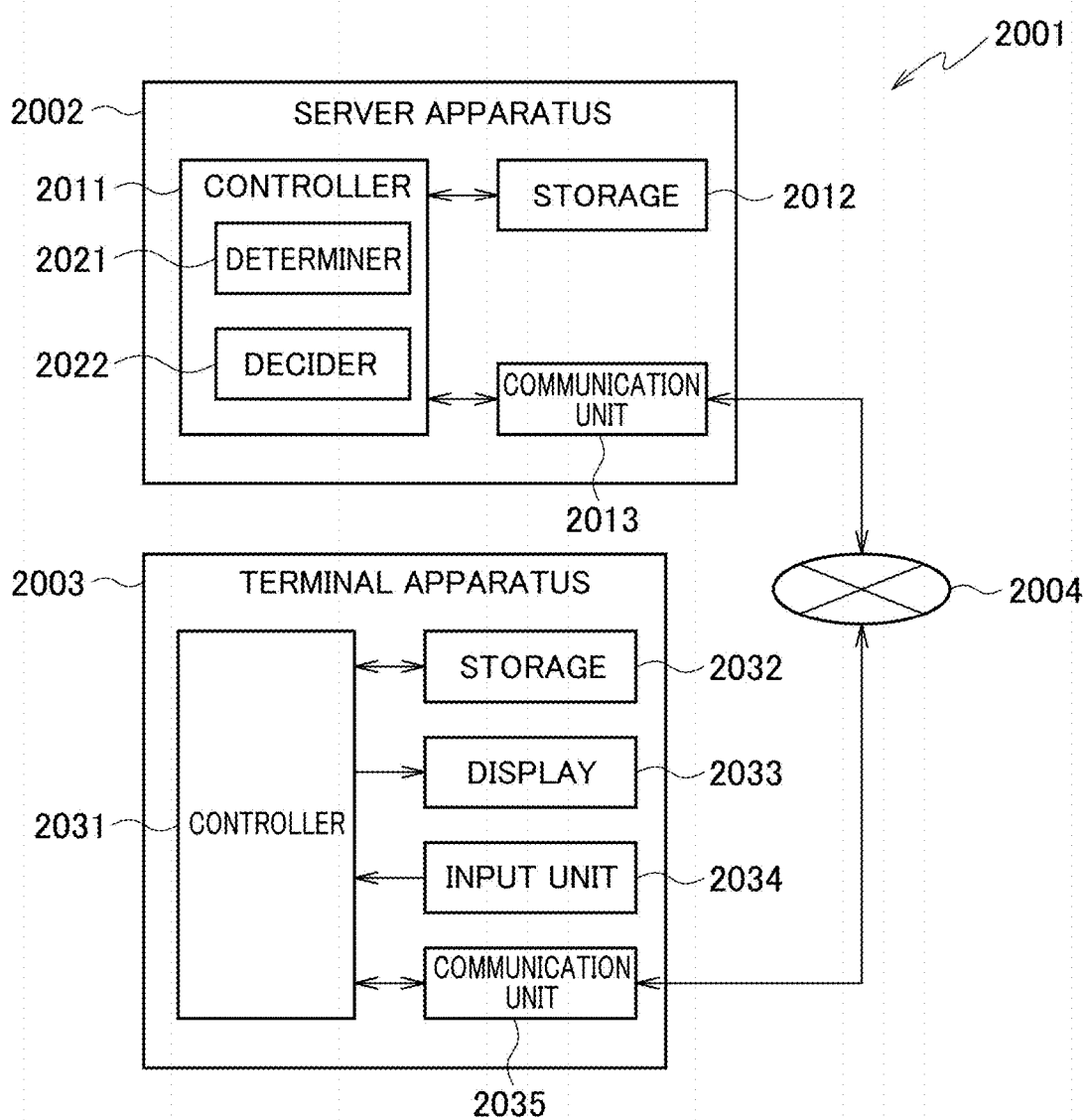
FIG. 10 is a block diagram illustrating a configuration of an information processing system according to a third embodiment.

FIG. 10 is a block diagram illustrating a configuration of an information processing system according to a third embodiment. As illustrated in FIG. 10, an information processing system 2001 according to the third embodiment includes a server apparatus (information processing apparatus) 2002 and a terminal apparatus 2003. The server apparatus 2002 and the terminal apparatus 2003 are communicably connected to each other via a network 2004 such as the Internet.

The server apparatus 2002 performs color combination check on inputted image data from the terminal apparatus 2003. The color combination check is a process of determining whether or not a combination of two adjacent colors is a combination in which a person with color blindness is likely to confuse the two colors, and deciding a proposed change of one of the two colors in the combination in which the person with color blindness is likely to confuse the two colors. The server apparatus 2002 is formed of a computer including a CPU, a ROM, a RAM, a hard disk drive, and the like. Note that the server apparatus 2002 may be a cloud server provided on a cloud.

The server apparatus 2002 includes a controller 2011, a storage 2012, and a communication unit 2013.

The controller 2011 controls operations of the entire server apparatus 2002. The controller 2011 is configured by including a CPU and the like. The controller 2011 includes a determiner 2021 and a decider 2022. The CPU executes an information processing program stored in the storage 2012 to configure the units of the controller 2011.

The determiner 2021 determines whether or not the combination of the adjacent two colors in the inputted image data is the combination in which the person with color blindness is likely to confuse the two colors.

The color blindness includes protan (protanope and protanomaly) color blindness, deutan (deuteranope and deuteranomaly) color blindness, tritan (tritanope and tritanomaly) color blindness, and the like. The color blindness is the protan or deutan color blindness in most cases. In the third embodiment, the determiner 2021 determines whether or not the combination of the adjacent two colors in the inputted image data is a combination in which at least one of a person with protan color blindness and a person with deutan color blindness is likely to confuse the two colors.

For the combination determined by the determiner 2021 to be the combination in which the person with color blindness is likely to confuse the two colors, the decider 2022 decides the proposed change of one of the two colors such that the person with color blindness can distinguish the two colors and a degree of change of the changed color is minimized for a person with normal color vision.

The storage 2012 stores various programs. The storage 2012 is formed of a hard disk drive and the like.

The communication unit 2013 performs a communication process with the terminal apparatus 2003 via the network 2004.

The terminal apparatus 2003 generates image data in response to a user operation, and transmits this image data to the server apparatus 2002. The terminal apparatus 2003 is formed of a computer including a CPU, a ROM, a RAM, a hard disk drive, and the like.

The terminal apparatus 2003 includes a controller 2031, a storage 2032, a display 2033, an input unit 2034, and a communication unit 2035.

The controller 2031 controls operations of the entire terminal apparatus 2003. The controller 2031 is formed by including a CPU and the like.

The storage 2032 stores various programs. The storage 2032 is formed of a hard disk drive and the like.

The display 2033 displays various screen such as an application screen 2050 to be described later. The display 2033 is formed of a liquid crystal display panel and the like. The input unit 2034 receives an input operation of the user. The input unit 2034 includes a keyboard, a mouse, and the like.

The communication unit 2035 performs a communication process with the server apparatus 2002 via the network 2004.

Next, an operation of the color combination check in the server apparatus 2002 of the information processing system 2001 is described.

Figure 11:
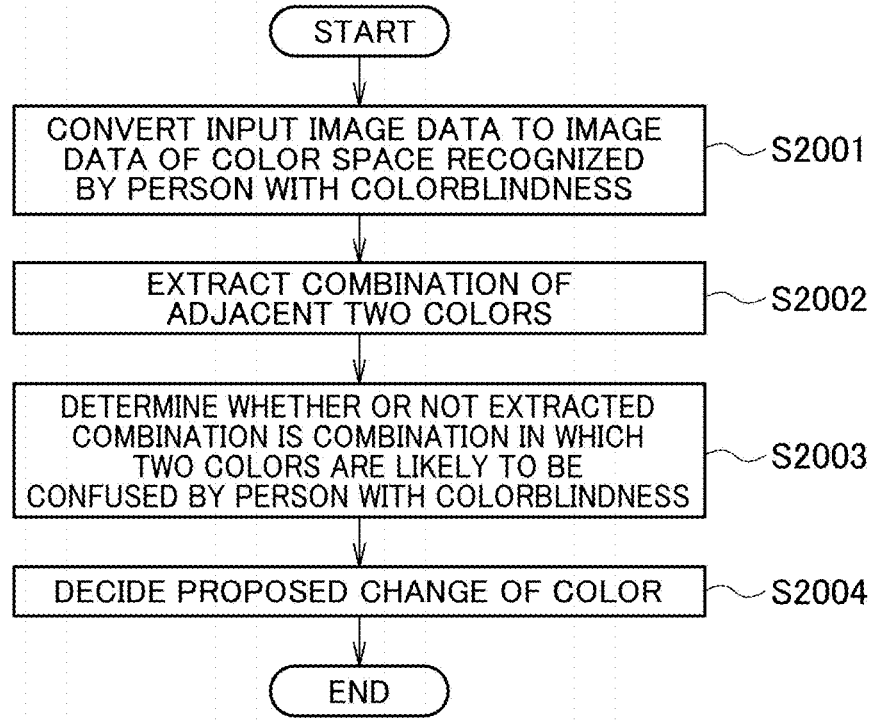
FIG. 11 is a flowchart for explaining operations of color combination check.

FIG. 11 is a flowchart for explaining the operation of the color combination check. A process of the flowchart of FIG. 11 is started when the inputted image data is inputted from the terminal apparatus 2003 into the server apparatus 2002.

In this case, the inputted image data is, for example, image data created with Word produced by Microsoft Corporation in the terminal apparatus 2003, a file obtained by converting this image data to a PDF file, or the like. In the third embodiment, the inputted image data is image data of standard RGB (SRGB) color space including objects of characters, figures, and pictures. Moreover, information indicating a position (coordinates) of each object is inputted into the server apparatus 2002 together with the inputted image data.

In step S2001 of FIG. 11, the determiner 2021 converts the inputted image data that is image data of a color space recognized by the person with normal color vision, to image data of a color space recognized by the person with color blindness. The conversion of the image data of the color space recognized by the person with normal color vision to the image data of the color space recognized by the person with color blindness can be performed by using a publicly-known method.

For example, the determiner 2021 first converts the inputted image data to image data of a linear sRGB color space by using the following formulae (1) to (3).

[Math 1]

$$R_{linear} = \left(\frac{R_{device} + 0.055}{1.055}\right)^{2.4} \quad (1)$$

$$G_{linear} = \left(\frac{G_{device} + 0.055}{1.055}\right)^{2.4} \quad (2)$$

$$B_{linear} = \left(\frac{B_{device} + 0.055}{1.055}\right)^{2.4} \quad (3)$$

In this case, Rdevice, Gdevice, and Bdevice in the formulae (1) to (3) are values of R, G, and B in the inputted image data, respectively. Moreover, Rlinear, Glinear, and Blinear in the formulae (1) to (3) are values of R, G, and B in the linear sRGB color space, respectively.

Next, the determiner 2021 converts the image of the linear sRGB color space to image data of an LMS color space recognized by the person with the normal color vision by using the following formula (4).

[Math 2]

$$\begin{pmatrix} L \\ M \\ S \end{pmatrix} = \begin{pmatrix} 0.31394 & 0.63957 & 0.04652 \\ 0.15530 & 0.75796 & 0.08673 \\ 0.01772 & 0.10945 & 0.87277 \end{pmatrix} \begin{pmatrix} R_{linear} \\ G_{linear} \\ B_{linear} \end{pmatrix} \quad (4)$$

Next, the determiner 2021 converts the image data of the LMS color space recognized by the person with the normal color vision to image data of an LMS color space recognized by the person with the protan color blindness by using the following formula (5). Moreover, the determiner 2021 converts the image data of the LMS color space recognized by the person with the normal color vision to image data of an LMS color space recognized by the person with the deutan color blindness by using the following formula (6).

[Math 3]

$$\begin{cases} \begin{pmatrix} L_p \\ M_p \\ S_p \end{pmatrix} = \begin{pmatrix} 0 & 1.20800 & -0.20797 \\ 0 & 1 & 0 \\ 0 & 0 & 1 \end{pmatrix} \begin{pmatrix} L \\ M \\ S \end{pmatrix} & \text{if } S \leq M \\ \begin{pmatrix} L_p \\ M_p \\ S_p \end{pmatrix} = \begin{pmatrix} 0 & 1.22023 & -0.22022 \\ 0 & 1 & 0 \\ 0 & 0 & 1 \end{pmatrix} \begin{pmatrix} L \\ M \\ S \end{pmatrix} & \text{if } S > M \end{cases} \quad (5)$$

$$\begin{cases} \begin{pmatrix} L_d \\ M_d \\ S_d \end{pmatrix} = \begin{pmatrix} 1 & 0 & 0 \\ 0.82781 & 0 & 0.17216 \\ 0 & 0 & 1 \end{pmatrix} \begin{pmatrix} L \\ M \\ S \end{pmatrix} & \text{if } S \leq L \\ \begin{pmatrix} L_d \\ M_d \\ S_d \end{pmatrix} = \begin{pmatrix} 1 & 0 & 0 \\ 0.81951 & 0 & 0.18046 \\ 0 & 0 & 1 \end{pmatrix} \begin{pmatrix} L \\ M \\ S \end{pmatrix} & \text{if } S > L \end{cases} \quad (6)$$

Then, the determiner 2021 converts the image data of the LMS color space recognized by the person with the protan color blindness to image data of an RGB color space recognized by the person with the protan color blindness. Moreover, the determiner 2021 converts the image data of the LMS color space recognized by the person with the deutan color blindness to image data of an RGB color space recognized by the person with the deutan color blindness. In this case, the conversion from the LMS color space to the RGB color space can be performed by using a publicly-known method.

Next, in step S2002, the determiner 2021 extracts a combination of adjacent two colors in the image data of the color space recognized by the person with color blindness (RGB color space recognized by the person with color blindness).

Specifically, the determiner 2021 searches for a combination of two objects that have different colors and that overlap each other in the image data of the color space recognized by the person with color blindness, by using information indicating the positions of the respective objects. Then, the determiner 2021 extracts a combination of two colors in the combination of the two objects that have different colors and that overlap each other, as the combination of adjacent two colors. Note that, in the case where an object includes multiple colors such as in the case where the object includes a solid painted portion and a frame line, each of the parts is assumed to be an object, and the colors of the respective parts form the combination of two adjacent colors.

In this case, the determiner 2021 extracts the combination of adjacent two colors for each of the image data of the color space recognized by the person with the protan color blindness and the image data of the color space recognized by the person with the deutan color blindness. In some cases, multiple combinations are extracted in each piece of image data.

Next, in step S2003, the determiner 2021 determines whether or not each of the combinations extracted in step S2002 is the combination in which the person with color blindness is likely to confuse the two colors.

Figure 12:
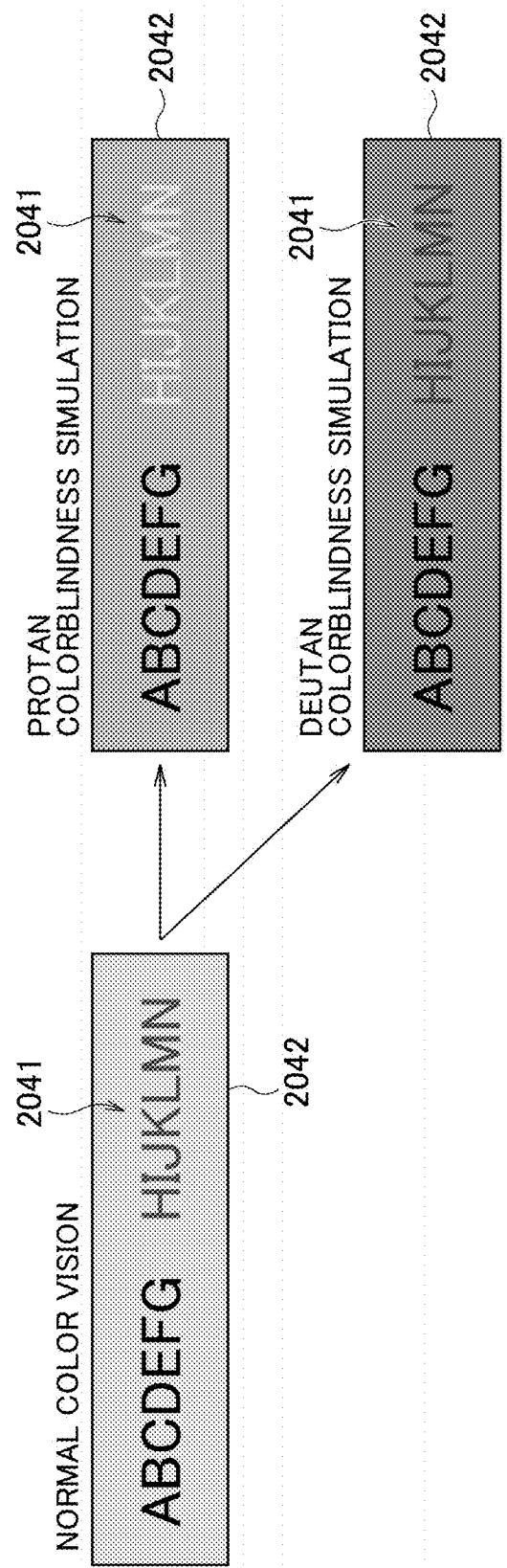
FIG. 12 is a diagram illustrating an example of a simulation of how an image is viewed by a person with color blindness.

An example of simulation of how an image is viewed by the person with protan color blindness and the person with deutan color blindness is illustrated in FIG. 12. As illustrated in FIG. 12, since a brightness difference between a color of a character object 2041 and a color of a background object 2042 in a vision of the person with color blindness is smaller than that in a vision of the person with normal color vision, the person with color blindness tends to confuse these two colors.

Accordingly, the determiner 2021 determines whether or not the combination of adjacent two colors is the combination in which the person with color blindness is likely to confuse the two colors, based on the brightness difference between the two colors recognized by the person with color blindness.

Specifically, the determiner 2021 converts an RGB value of each of the two colors recognized by the person with color blindness to an L*a*b* value for each combination. Conversion from the RGB value to the L*a*b* value can be performed by using a publicly-known method.

Then, when the difference in L* value that is the brightness difference between the two colors is equal to or less than a prescribed threshold, the determiner 2021 determines that the combination of two colors is the combination in which the person with color blindness is likely to confuse the two colors.

In this case, the determiner 2021 determines whether or not the combination in each of the image data of the color space recognized by the person with the protan color blindness and the image data of the color space recognized by the person with the deutan color blindness is the combination in which the person with the corresponding color blindness is likely to confuse the two colors.

Then, in step S2004, for the combination determined to be the combination in which the person with color blindness is likely to confuse the two colors by the determiner 2021, the decider 2022 decides the proposed change of one of the two colors such that the person with color blindness can distinguish the two colors and the degree of change of the changed color is minimized for the person with normal color vision.

L*a*b* values of two colors that correspond to the two colors in the combination in which the person with color blindness is likely to confuse the two colors and that are recognized by the person with normal color vision are assumed to be [L1_n, a1_n, b1_n] and [L2_n, a2_n, b2_n], respectively. Out of these colors, the color of [L2_n, a2_n, b2_n] is assumed to be set as a target of change.

Moreover, L*a*b* values of the above two colors recognized by the person with protan color blindness are assumed to be [L1_p, a1_p, b1_p] and [L2_p, a2_p, b2_p], respectively. Furthermore, L*a*b* values of the above two colors recognized by the person with deutan color blindness are assumed to be [L1_d, a1_d, b1_d] and [L2_d, a2_d, b2_d], respectively.

The decider 2022 obtains [L3_n, a3_n, b3_n] that is an L*a*b* value of a color recognized by the person with normal color vision after change of the change target color, by solving a constrained optimization problem that minimizes an evaluation function J and that is described in the following formula (7).

[Math 4]

$$\min J(L3\_n, a3\_n, b3\_n) = \sqrt{(a2\_n-a3\_n)^2 + (b2\_n-b3\_n)^2}$$

$$s.t.$$

$$const < |L1\_p - L3\_p|$$

$$const < |L1\_d - L3\_d|$$

$$[L3\_n, a3\_n, b3\_n] \in RGB \text{ color space} \quad (7)$$

In this case, min J(x)=f(x) is a formula expressing an optimization problem for obtaining a vector x that minimizes the evaluation function J. Moreover, s.t. expresses a constraining condition for a variable of the evaluation function J.

The formula in the first line in the formula (7) means obtaining a color whose color difference to the color before the change is minimized for the person with normal color vision, as the color after the change.

Moreover, const in the formula (7) is set in advance as a threshold of a brightness difference at which the person with color blindness can distinguish the two colors. Furthermore, L3_p and L3_d in the formula (7) are each an L* value of a color in the case where the person with a corresponding one of the protan color blindness and the deutan color blindness recognizes the above color of [L3_n, a3_n, b3_n].

Furthermore, the condition in the last line of the formula (7) means that this problem is solved under the condition that the L*a*b* value is a value corresponding to a color that can be expressed in the RGB color space.

When there are multiple solutions for the constrained optimization problem of the formula (7), the determiner 2021 selects a color with the smallest brightness difference from the change target color as the color of the proposed change. Specifically, the determiner 2021 selects a color in which |L2_n-L3_n| is minimum as the color of the proposed change.

A specific example of a method of solving the constrained optimization problem of the formula (7) is described.

First, the L*a*b*color space recognized by the person with normal color vision is quantized at prescribed intervals, and all L*a*b* values are listed.

Then, each of the above L*a*b* values recognized by the person with normal color vision in the list is converted to an L*a*b* value recognized by the person with the protan color blindness, and the converted L*a*b* value is held in association with the corresponding L*a*b* value recognized by the person with normal color vision. Moreover, each of the above L*a*b* values recognized by the person with normal color vision in the list is converted to an L*a*b* value recognized by the person with the deutan color blindness, and the converted L*a*b* value is held in association with the corresponding L*a*b* value recognized by the person with normal color vision.

In this case, the conversion from the L*a*b* value recognized by the person with normal color vision to the L*a*b* value recognized by the person with the protan color blindness and the conversion from the L*a*b* value recognized by the person with normal color vision to the L*a*b* value recognized by the person with the deutan color blindness can be performed by using a publicly-known method.

For example, when the L*a*b* value recognized by the person with normal color vision is converted to the L*a*b* value recognized by the person with the protan color blindness, first, the L*a*b* value recognized by the person with normal color vision is converted to an RGB value recognized by the person with normal color vision. Then, the RGB value recognized by the person with normal color vision is converted to an RGB value recognized by the person with the protan color blindness. This conversion can be performed by using the method described above in step S2001. Then, the RGB value recognized by the person with the protan color blindness is converted to the L*a*b* value recognized by the person with the protan color blindness. The conversion between the RGB value and the L*a*b* value can be performed by using a publicly-known method.

The conversion from the L*a*b* value recognized by the person with normal color vision to the L*a*b* value recognized by the person with deutan color blindness can be performed in a manner similar to the above conversion to the L*a*b* value recognized by the person with protan color blindness.

Then, the L*a*b* values recognized by the person with normal color vision and corresponding to the L*a*b* values that are included in the above list of the L*a*b* values recognized by the person with the protan color blindness and whose brightness (L* value) differences to [L1_p, a1_p, b1_p] are equal to or less than const in the formula (7) are deleted from the list of the L*a*b* values recognized by the person with normal color vision. Moreover, the L*a*b* values recognized by the person with normal color vision and corresponding to the L*a*b* values that are among the above L*a*b* values recognized by the person with the deutan color blindness and whose brightness (L* value) differences to [L1_d, a1_d, b1_d] are equal to or less than const in the formula (7) are deleted from the list of the L*a*b* values recognized by the person with normal color vision.

L*a*b* values of multiple colors whose brightness differences to [L1_n, a1_n, b1_n] being the L*a*b* value of the color not being the change target are greater than const are thereby left in the above list of the L*a*b* values recognized by the person with normal color vision. Specifically, as illustrated in FIG. 13, multiple colors whose brightness differences to the color not being the change target are greater than const are extracted from the L*a*b*color space recognized by the person with normal color vision.

Then, an L*a*b* value whose distance from [L2_n, a2_n, b2_n] being the L*a*b* value of the change target color is the smallest on an a*b*plane is selected from among the L*a*b* values that are left in the list of the L*a*b* values recognized by the person with normal color vision and that are L*a*b* values of colors expressible in the RGB color space.

Figure 13:
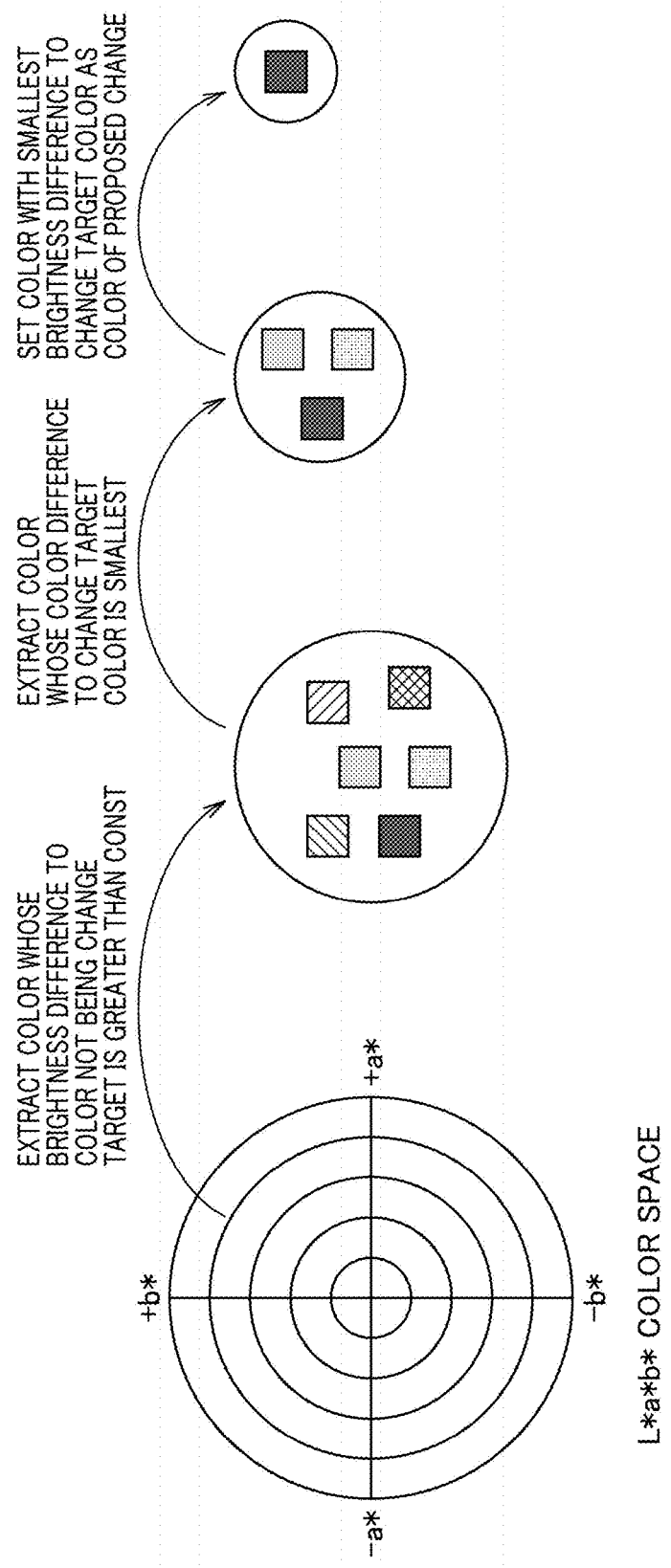
FIG. 13 is an explanatory diagram of steps of determining a proposed change of color in the color combination check.

As illustrated in FIG. 13, the color that can be expressed in the RGB color space and whose color difference to the change target color is the smallest is thereby extracted from the colors extracted as the colors whose brightness differences to the color not being the change target are greater than const. The color whose color difference to the change target color is the smallest means the color with the smallest degree of color change from the change target color for the person with normal color vision.

Figure 14:
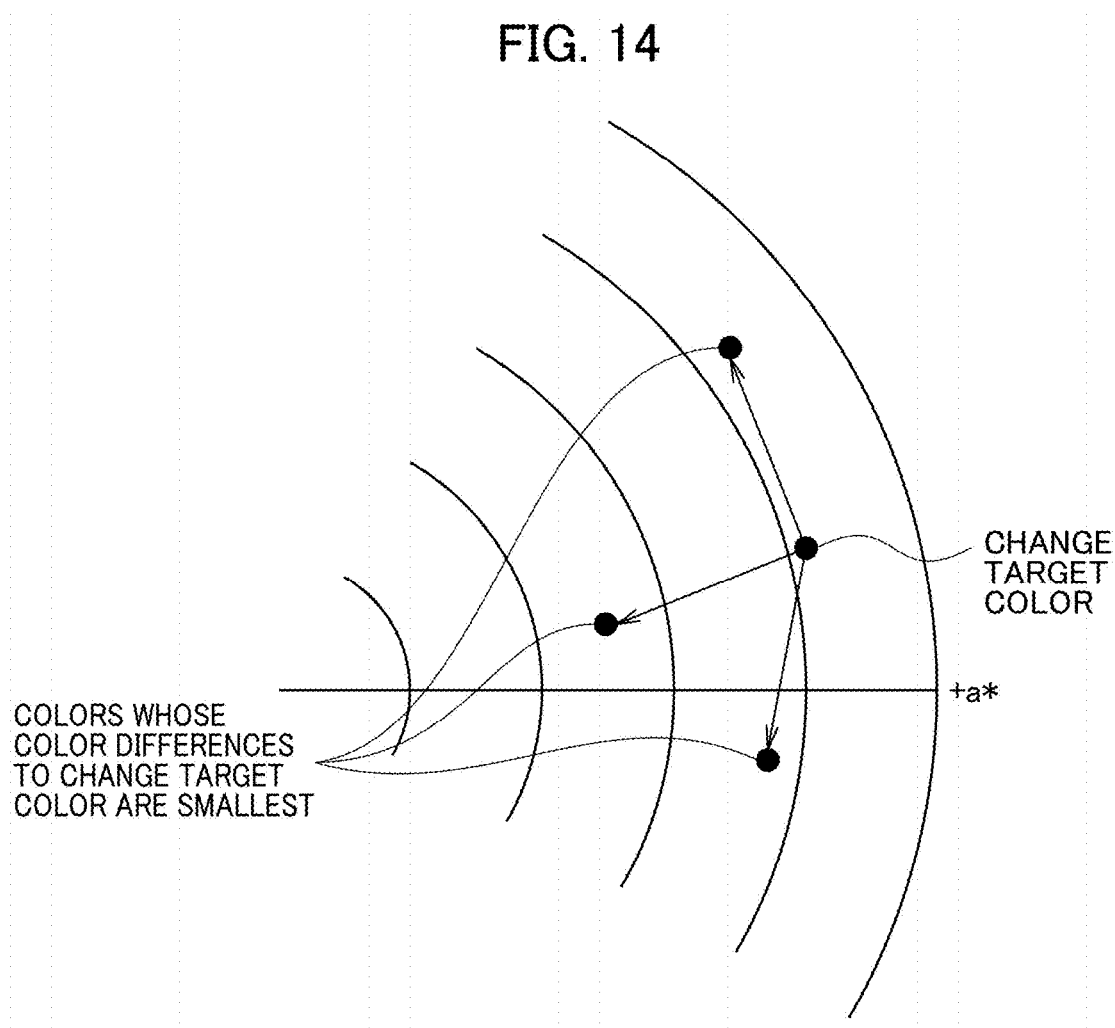
FIG. 14 is a diagram explaining that there may be multiple colors whose color differences to a change target color are the smallest.

In this case, as illustrated in FIG. 14, there may be multiple colors whose color differences (distances on the a*b*plane) to the change target color are the smallest. When there are multiple colors whose color differences to the change target color are the smallest, that is when there are multiple solutions for the constrained optimization problem of the formula (7), a color whose brightness difference to the change target color is the smallest is selected as the color of the proposed change.

The decider 2022 decides the proposed change of one of the two colors for each of the combinations in which at least one of the person with protan color blindness and the person with deutan color blindness is likely to confuse the two colors, by solving the constrained optimization problem of the formula (7) as described above. The color combination check is thereby completed.

When the color combination check is completed, the decider 2022 transmits the result of the check to the terminal apparatus 2003. Thus, in the terminal apparatus 2003, it is possible to display, on the display 2033, the proposed change of one of the two colors in the combination in which the person with color blindness is likely to confuse the two colors and notify the user of the proposed change.

Figure 15:
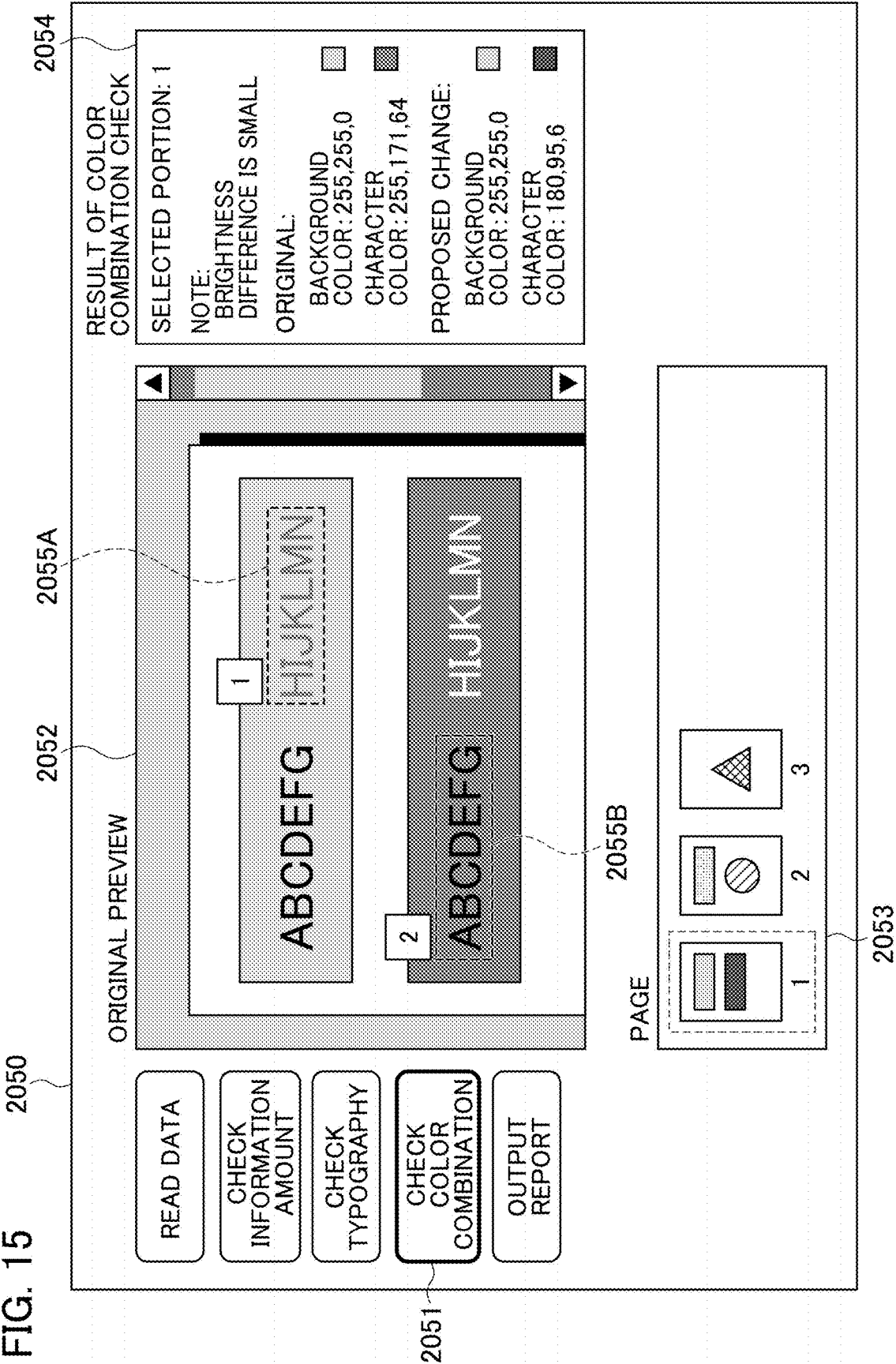
FIG. 15 is a diagram illustrating an example of an application screen.

An example of an application screen for notifying the user of the proposed change of one of the two colors in the combination in which the person with color blindness is likely to confuse the two colors is illustrated in FIG. 15.

The application screen 2050 illustrated in FIG. 15 is, for example, a display screen of an original check application that performs various checks such as the color combination check of an original. A color combination check button 2051, an original display portion 2052, a page selection portion 2053, and a result display portion 2054 are displayed in the application screen 2050.

The color combination check button 2051 is a button for instructing execution of the color combination check of an original. When the color combination check button 2051 is pressed, image data of the original read into the application in advance is transmitted to the server apparatus 2002, and the above color combination check is performed in the server apparatus 2002.

The original display portion 2052 is a region in which an image of the original being a check target is displayed. An image of a page selected from the page selection portion 2053 is displayed in the original display portion 2052.

Display frames 2055A, 2055B, and so on are displayed to overlap the original in the original display portion 2052, the display frames 2055A, 2055B, and so on each indicating a position of a combination of two colors determined to be the combination in which the person with color blindness is likely to confuse the two colors by the color combination check. Moreover, numbers for identifying the respective regions of the display frames 2055A, 2055B, and so on are displayed to correspond to the display frames 2055A, 2055B, and so on.

Each of the pages of the original being the check target is displayed in the page selection portion 2053 as a choice of a page to be displayed in the original display portion 2052.

The result display portion 2054 is a region in which a result of the color combination check is displayed. Specifically, in the result display portion 2054, there are displayed original two colors and a proposed change of changing one of the two colors in the combination in which the person with color blindness is likely to confuse the two colors and that is selected from among the display frames 2055A, 2055B, and so on. In the example of FIG. 15, there are displayed original colors of a character color and a background color and a proposed change of the character color in the combination of the character color and the background color at the position of the display frame 2055A.

As described above, in the server apparatus 2002, for the combination determined to be the combination in which the person with color blindness is likely to confuse the two colors by the determiner 2021, the decider 2022 decides the proposed change of one of the two colors such that the person with color blindness can distinguish the two colors and the degree of change of the changed color is minimized for the person with normal color vision. This can reduce likeliness of confusion of colors by the person with color blindness while suppressing a change in color for the person with normal color vision.

Moreover, in the server apparatus 2002, the determiner 2021 determines whether or not the combination of the adjacent two colors is the combination in which the person with color blindness is likely to confuse the two colors, based on the brightness difference between the two colors recognized by the person with color blindness. The determiner 2021 can thereby easily accurately determine whether or not the combination is the combination in which the person with color blindness is likely to confuse the two colors.

Furthermore, in the server apparatus 2002, the decider 2022 determines the degree of color change for the person with normal color vision based on the color difference between the color before the change and the color after the change recognized by the person with normal color vision (color difference between the change target color and the color of the proposed change). The decider 2022 can thereby decide a proposed change of color in which a change in hue for the person with normal color vision is suppressed.

Note that the configuration may be such that, when there are multiple combinations of two colors likely to be confused by the person with color blindness and one of the two colors is common among the combinations, the common color is set as the change target and a common proposed change for the common color is decided such that the person with color blindness can distinguish the two colors in each combination and the degree of change of the changed color is minimized for the person with normal color vision.

Moreover, although whether or not the combination is the combination in which the person with color blindness is likely to confuse the two colors is determined based on the brightness difference between the two colors recognized by the person with color blindness in the above third embodiment, the determination is not limited to this. For example, the determination may be made based on the a* values and the b* values of the two colors recognized by the person with color blindness.

Furthermore, although the degree of color change for the person with normal color vision is determined based on the color difference in the above third embodiment, the determination is not limited to this. For example, the determination may be made based on a brightness difference.

Moreover, the proposed change of one of the two colors in the combination in which the person with color blindness is likely to confuse the two colors is decided in the above third embodiment. However, a proposed change in which both colors in the combination of the two colors are changed may be decided. The decider 2022 only needs to decide, for the combination determined to be the combination in which the person with color blindness is likely to confuse the two colors by the determiner 2021, a combination in which at least one of the two colors is changed such that the person with color blindness can distinguish the two colors and in which a degree of color change of at least one color to be changed out of the two colors is minimized for the person with normal color vision, as the proposed change of the combination of the two colors. In this case, when both colors in the combination are to be changed, the decider 2022 only needs to decide a combination in which a total of degrees of changes of the respective two colors is minimized for the person with normal color vision among the combinations in which the two colors are changed such that the person with color blindness can distinguish the two colors, as the proposed change of the combination of the two colors.

Furthermore, the color of proposed change being the color that can be expressed in the RGB color space is set as the condition in the above third embodiment. However, when there is no need for the color of proposed change to be the color that can be expressed in the RGB color space, this condition may be omitted. Moreover, the color of proposed change being a color that can be expressed in a color space other than the RGB color space may be set as the condition.

Moreover, although the protan color blindness and the deutan color blindness are intended as the color blindness in the above third embodiment, other types of color blindness may be taken into consideration.

Moreover, although the server apparatus 2002 performs the color combination check in the above third embodiment, the terminal apparatus 2003 may perform the color combination check.

The embodiment of the present disclosure has, for example, the following configuration.

(Appendix 16)

An information processing apparatus includes:
  a determiner configured to determine whether a combination of adjacent two colors in inputted image data is a combination in which a person with color blindness is likely to confuse the two colors; and
  a decider configured to decide, as a proposed change of the combination of the two colors, for the combination determined to be the combination in which the person with color blindness is likely to confuse the two colors by the determiner, a combination in which at least one of the two colors is changed such that the person with color blindness is capable of distinguishing the two colors and in which a degree of change of the at least one changed color of the two colors is minimized for a person with normal color vision.

(Appendix 17)

The information processing apparatus according to Appendix 16, wherein the determiner is configured to determine whether the combination of adjacent two colors is the combination in which the person with color blindness is likely to confuse the two colors, based on a brightness difference between the two colors recognized by the person with color blindness.

(Appendix 18)

The information processing apparatus according to Appendix 16, wherein the decider is configured to determine the degree of change of the at least one changed color for the person with normal color vision based on a color difference between a color before the change and a color after the change recognized by the person with normal color vision.

(Appendix 19)

An information processing method executed by a computer, the method including:
  determining whether a combination of adjacent two colors in inputted image data is a combination in which a person with color blindness is likely to confuse the two colors; and
  deciding, as a proposed change of the combination of the two colors, for the combination determined to be the combination in which the person with color blindness is likely to confuse the two colors, a combination in which at least one of the two colors is changed such that the person with color blindness is capable of distinguishing the two colors and in which a degree of change of the at least one changed color of the two colors is minimized for a person with normal color vision.

(Appendix 20)

A non-transitory computer-readable storage medium storing an information processing program causing a computer to execute processing including:
  determining whether a combination of adjacent two colors in inputted image data is a combination in which a person with color blindness is likely to confuse the two colors; and
  deciding, as a proposed change of the combination of the two colors, for the combination determined to be the combination in which the person with color blindness is likely to confuse the two colors, a combination in which at least one of the two colors is changed such that the person with color blindness is capable of distinguishing the two colors and in which a degree of change of the at least one changed color of the two colors is minimized for a person with normal color vision.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

The invention claimed is:

1. An information processing apparatus comprising:
  a determiner circuit configured to determine whether two adjacent colors of a combination thereof in inputted image data are likely to be indistinguishable by a colorblind person; and
  a decider circuit configured, when the determiner circuit determines that the two adjacent colors are likely to be indistinguishable by the colorblind person,
    to change at least one color of the two adjacent colors to a color distinguishable by the colorblind person from the other color in the two adjacent colors, and
    to minimize the degree of change of at least a color difference of the changed at least one color so that a person with normal color vision can still distinguish the changed at least one color from the other color.

2. The information processing apparatus according to claim 1, wherein the determiner circuit is configured to determine whether a colorblind person is likely to confuse the two adjacent colors based on a brightness difference between the two adjacent colors.

3. An information processing method executed by a computer, the method comprising:
  determining whether two adjacent colors of a combination thereof in inputted image data are likely to be indistinguishable by a colorblind person; and
  deciding, when the determining operation determines that the two adjacent colors are likely to be indistinguishable by the colorblind person, to change at least one color of the two adjacent colors to a color distinguishable by the colorblind person from the other color in the two adjacent colors, and to minimize the degree of change of at least a color difference of the changed at least one color so that a person with normal color vision can still distinguish the changed at least one color from the other color.

4. A non-transitory computer-readable storage medium storing an information processing program causing a computer to execute processing comprising:

determining whether two adjacent colors in inputted image data are likely to be indistinguishable by a colorblind person; and deciding, when the determining operation determines that the two adjacent colors are likely to be indistinguishable by the colorblind person, to change at least one color of the two adjacent colors to a color distinguishable by the colorblind person from the other color in the two adjacent colors, and to minimize the degree of change of at least a color difference of the changed at least one color so that a person with normal color vision can still distinguish the changed at least one color from the other color.

5. The information processing apparatus according to claim 1, wherein the decider circuit is configured to minimize the degree of change of at least the color difference of the changed at least one color by extracting colors in a first extraction from the inputted image data whose brightness difference with the other color is greater than a constant threshold, extracting, in a second extraction, a first color from the colors of the first extraction whose color difference with the at least one color is the smallest, and setting the first color extracted in the second extraction as the changed at least one color that is distinguishable by the colorblind person from the other color, and minimizes the degree of change of the color difference of the changed at least one color for a person with normal color vision.

6. The information processing apparatus according to claim 5, wherein in the event the second extraction extracts plural first colors whose color difference with the at least one color is the smallest, the decider circuit is configured to select the first color from among the plural first colors whose brightness difference with the at least one color is the smallest.

7. The information processing apparatus according to claim 1, wherein the input image data has a character image and a background image against which the character image is placed, and one of the two adjacent colors is the color of the character image, and the other of the two adjacent colors is the color of the background image.

8. The information processing apparatus according to claim 7, wherein the apparatus further comprises a terminal including a display, the display of the terminal displays an application screen displaying a display frame displaying the character image and background image, a color combination button for instructing execution of the operation of the determiner circuit, a result display portion in which the result of the operation of the determiner circuit is displayed by displaying the two adjacent colors before and after the at least one of the two colors is changed, and a page selection portion displaying icons representing different pages of the input image data.

9. The information processing method according to claim 3, wherein the deciding operation minimizes the degree of change of at least the color difference of the changed at least one color by extracting colors in a first extraction from the inputted image data whose brightness difference with the other color is greater than a constant threshold, extracting, in a second extraction, a first color from the colors of the first extraction whose color difference with the at least one color is the smallest, and setting the first color extracted in the second extraction as the changed at least one color that is distinguishable by the colorblind person from the other color, and minimizes the degree of change of the color difference of the changed at least one color for a person with normal color vision.

10. The information processing method according to claim 9, wherein in the event the second extraction extracts plural first colors whose color difference with the at least one color is the smallest, the deciding operation selects the first color from among the plural first colors whose brightness difference with the at least one color is the smallest.

11. The information processing method according to claim 3, wherein the input image data has a character image and a background image against which the character image is placed, and one of the two adjacent colors is the color of the character image, and the other of the two adjacent colors is the color of the background image.

12. The information processing method according to claim 11, further comprising displaying on a display of a terminal an application screen displaying a display frame displaying the character image and background image, a color combination button for instructing execution of the determining operation, a result display portion in which the result of the determining operation is displayed by displaying the two adjacent colors before and after the at least one of the two colors is changed, and a page selection portion displaying icons representing different pages of the input image data.

13. The non-transitory computer-readable storage medium storing an information processing program according to claim 4, wherein the deciding operation minimizes the degree of change of at least the color difference of the changed at least one color by extracting colors in a first extraction from the inputted image data whose brightness difference with the other color is greater than a constant threshold, extracting, in a second extraction, a first color from the colors of the first extraction whose color difference with the at least one color is the smallest, and setting the first color extracted in the second extraction as the changed at least one color that is distinguishable by the colorblind person from the other color, and minimizes the degree of change of the color difference of the changed at least one color for a person with normal color vision.

14. The non-transitory computer-readable storage medium storing an information processing program according to claim 13, wherein
in the event the second extraction extracts plural first colors whose color difference with the at least one color is the smallest, the deciding operation selects the first color from among the plural first colors whose brightness difference with the at least one color is the smallest.

15. The non-transitory computer-readable storage medium storing an information processing program according to claim 4, wherein
the input image data has a character image and a background image against which the character image is placed, and
one of the two adjacent colors is the color of the character image, and the other of the two adjacent colors is the color of the background image.

16. The non-transitory computer-readable storage medium storing an information processing program according to claim 15, wherein the information processing program causes the computer to execute processing further comprising
displaying on a display of a terminal an application screen displaying
a display frame displaying the character image and background image,
a color combination button for instructing execution of the determining operation,
a result display portion in which the result of the determining operation is displayed by displaying the two adjacent colors before and after the at least one of the two colors is changed, and
a page selection portion displaying icons representing different pages of the input image data.

* * * * *